United States Patent
Nako et al.

(10) Patent No.: US 8,867,840 B2
(45) Date of Patent: Oct. 21, 2014

(54) INFORMATION PROCESSING DEVICE AND METHOD FOR CONTROLLING AN INFORMATION PROCESSING DEVICE

(75) Inventors: Kazuyuki Nako, Osaka (JP); Hitoshi Hirose, Osaka (JP); Akira Fujiwara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 201 days.

(21) Appl. No.: 13/511,666

(22) PCT Filed: Jul. 29, 2010

(86) PCT No.: PCT/JP2010/062833
§ 371 (c)(1),
(2), (4) Date: May 24, 2012

(87) PCT Pub. No.: WO2011/065065
PCT Pub. Date: Jun. 3, 2011

(65) Prior Publication Data
US 2012/0274803 A1    Nov. 1, 2012

(30) Foreign Application Priority Data
Nov. 25, 2009   (JP) ................ 2009-267853

(51) Int. Cl.
| G06K 9/46 | (2006.01) |
| H04M 1/725 | (2006.01) |
| G06K 9/00 | (2006.01) |
| G06K 9/22 | (2006.01) |
| G06K 9/32 | (2006.01) |

(52) U.S. Cl.
CPC ........... *G06K 9/228* (2013.01); *H04M 1/72522* (2013.01); *H04M 2250/52* (2013.01); *G06K 9/00993* (2013.01); *G06K 9/325* (2013.01)
USPC ....................................................... 382/190

(58) Field of Classification Search
None
See application file for complete search history.

(56) References Cited

U.S. PATENT DOCUMENTS

| 2005/0052558 A1 | 3/2005 | Yamazaki | |
| 2006/0103893 A1* | 5/2006 | Azimi et al. | ................. 358/474 |
| 2009/0171949 A1* | 7/2009 | Zygmunt | .......................... 707/5 |

FOREIGN PATENT DOCUMENTS

| JP | 57-146380 A | 9/1982 |
| JP | 1-234977 A | 9/1989 |
| JP | 2-12482 A | 1/1990 |
| JP | 11-203450 A | 7/1999 |
| JP | 2000-20677 A | 1/2000 |
| JP | 2004-199141 A | 7/2004 |
| JP | 1595944 A | 3/2005 |
| JP | 2007-18166 A | 1/2007 |

* cited by examiner

*Primary Examiner* — Nirav G Patel
*Assistant Examiner* — Amandeep Saini
(74) *Attorney, Agent, or Firm* — Birch, Stewart, Kolasch & Birch, LLP

(57) ABSTRACT

Provided is an information processing device that is capable of recognizing characters in an image quickly. The portable phone according to the present invention is a device that recognizes words and phrases from an image. The portable phone includes: an image capturing section that captures a moving image; a character string obtaining section, a character string collation section, and a word and phrase ID obtaining section, which successively obtains consecutive images that constitute the captured moving image and obtains an ID indicative of a word or a phrase at a predetermined position of the image; a FIFO buffer for storing the obtained ID; and a recognition determination section that determines, as a recognition result, an ID that is stored in the FIFO buffer by the most number.

15 Claims, 19 Drawing Sheets

F I G. 5

| ID | WORD OR PHRASE | MEANING / JAPANESE READING |
|---|---|---|
| 1 | .... | .... |
| ⋮ | ⋮ | ⋮ |
| 1111 | MANAGEMENT | KANRI |
| ⋮ | ⋮ | ⋮ |
| 1212 | SOCIETY | SHAKAI |
| ⋮ | ⋮ | ⋮ |
| 2222 | CARELESS | ZUSAN |
| ⋮ | ⋮ | ⋮ |
| 3333 | ROAD | MICHI |
| ⋮ | ⋮ | ⋮ |
| 4444 | HOKKAI | HOKKAI |
| 4445 | HOKKAIDO | HOKKAIDO |
| ⋮ | ⋮ | ⋮ |
| 24680 | as soon as | IMMEDIATELY AFTER |
| ⋮ | ⋮ | ⋮ |
| 28000 | soon | SHORTLY |
| ⋮ | ⋮ | ⋮ |

F I G. 8
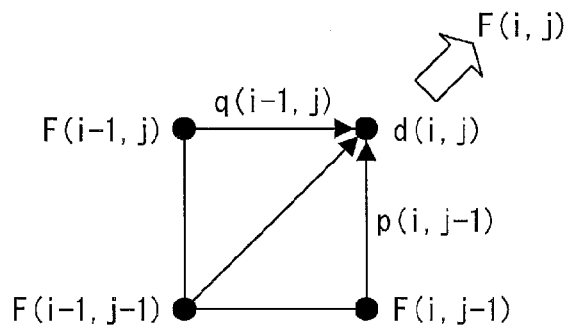
F I G. 9
| | ID |
|---|---|
| 1 | 0 |
| 2 | 0 |
| 3 | 0 |
| 4 | 0 |
| 5 | 0 |
| 6 | 0 |
| 7 | 0 |
| 8 | 0 |

FIG. 10

|   | ID |
|---|---|
| 1 | 0 |
| 2 | 0 |
| 3 | 0 |
| 4 | 0 |
| 5 | 0 |
| 6 | 0 |
| 7 | 0 |
| 8 | 2222 |

FIG. 11

|   | ID |
|---|---|
| 1 | 2222 |
| 2 | 1212 |
| 3 | 2222 |
| 4 | 2222 |
| 5 | 2222 |
| 6 | 1212 |
| 7 | 2222 |
| 8 | 2222 |

FIG. 12

|   | ID   |
|---|------|
| 1 | 2222 |
| 2 | 0    |
| 3 | 2222 |
| 4 | 2222 |
| 5 | 2222 |
| 6 | 1111 |
| 7 | 1111 |
| 8 | 1111 |

FIG. 13

|   | ID   |
|---|------|
| 1 | 0    |
| 2 | 2222 |
| 3 | 2222 |
| 4 | 2222 |
| 5 | 1111 |
| 6 | 1111 |
| 7 | 1111 |
| 8 | 1111 |

F I G. 1 5
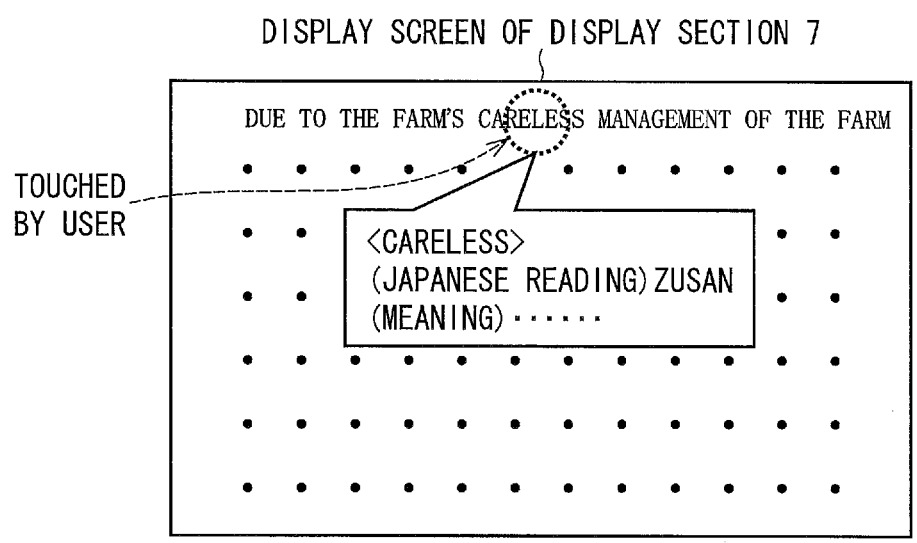

F I G. 16
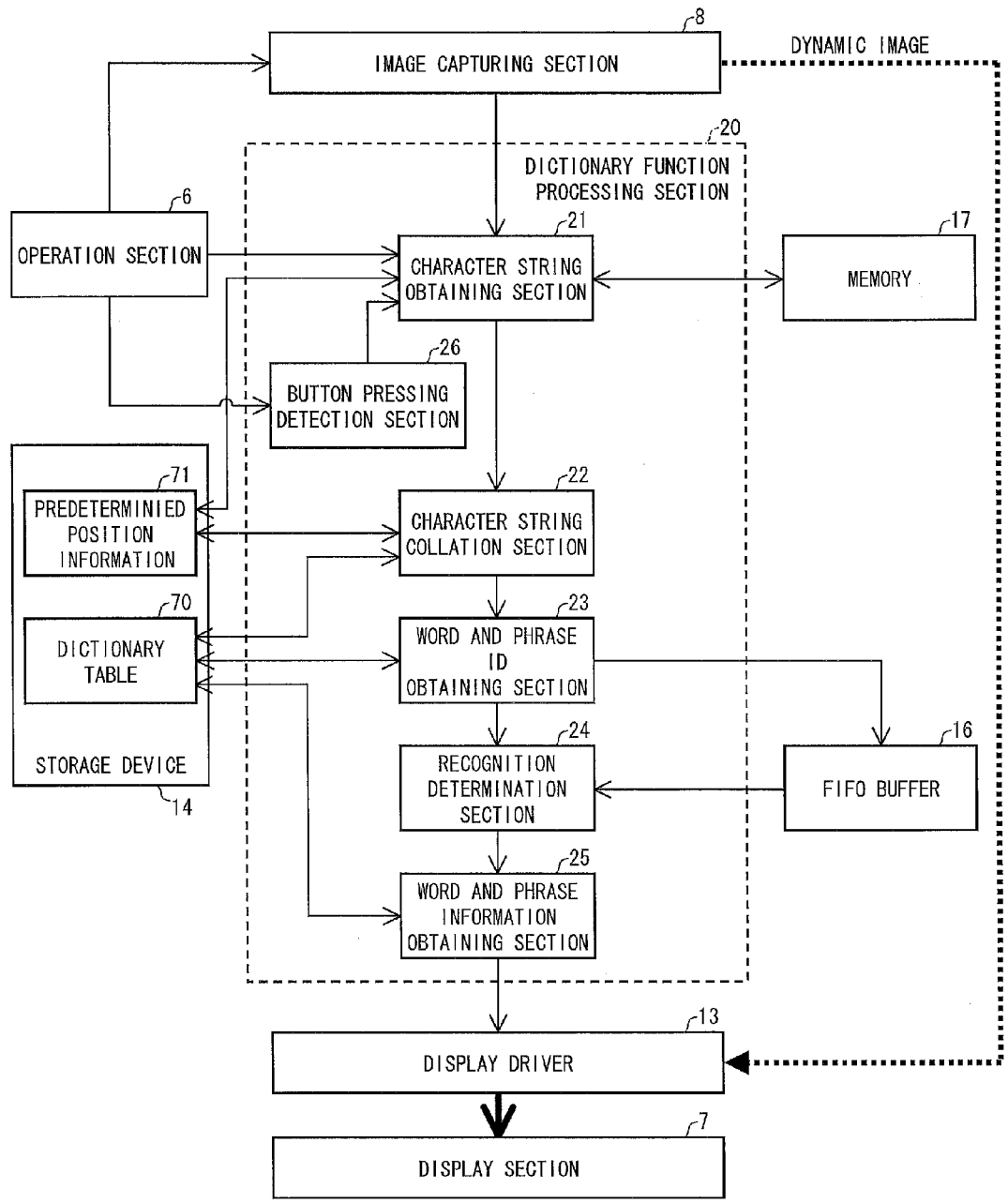

F I G. 1 8
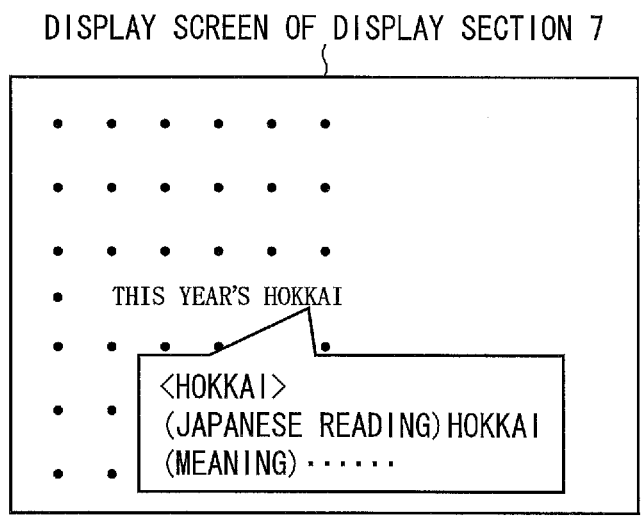
F I G. 1 9
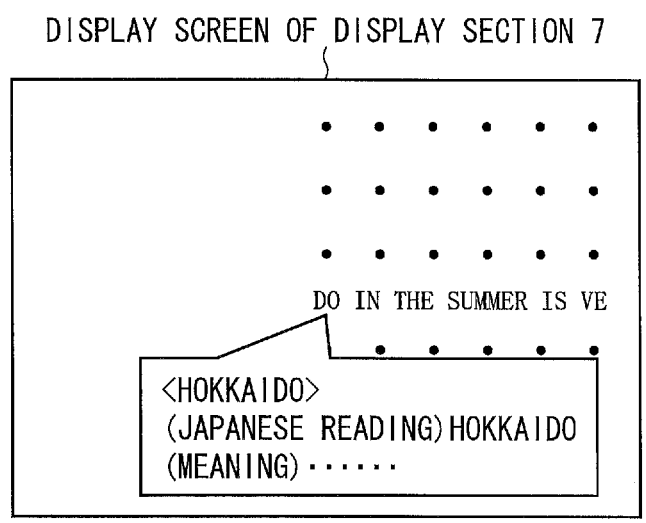

F I G. 2 6

■ JUMP TO DICTIONARY ■

<CARELESS> ZUSAN
  ⇒   TO JAPANESE DICTIONARY
      TO JAPANESE-ENGLISH DICTIONARY

INFORMATION PROCESSING DEVICE AND METHOD FOR CONTROLLING AN INFORMATION PROCESSING DEVICE

TECHNICAL FIELD

The present invention relates to an information processing device that carries out recognition of words and phrases from an image.

BACKGROUND ART

Electronic dictionaries are now commonly used as a replacement of the conventional paper dictionaries, by the reduction in its size and the fall in its prices. Furthermore, PDA (Personal Digital Assistant, portable information terminal), portable phones and like terminals that install an electronic dictionary are being developed in the recent years.

General electronic dictionaries have entering means such as a keyboard to support easy entering of words and phrases, so as to allow a user to enter a word or a phrase by operating this keyboard and retrieve a meaning of that word or phrase. However, some models of the PDA, portable phones, or the like do not have such a keyboard as the entering means. In order to use the electronic dictionary installed in such a model, the user uses another entering means to enter a word or phrase, for example numeric keys or a touch panel provided in the PDA or the portable phone. In a case of a configuration in which a word or phrase is to be entered with use of the entering means such as the touch panel or numeric keys as such, operability deteriorates as compared to the configuration in which entry is made via the keyboard, thereby making it difficult to enter characters quickly. Moreover, even with the electronic dictionary having the keyboard as the entering means, if the user is not used to keyboard operations, the entering of characters with the keyboard becomes an extremely difficult and time consuming work.

Moreover, the user may not know which word (word or phrase) to enter, when the user looks up an English phrase made up of a plurality of words or when the user looks up a Japanese reading of a difficult Chinese character or a character of an unknown country. On this account, key entry with the keyboard or the like had its limits. Accordingly, techniques have been developed, which allow for omitting the trouble of the key entry (e.g. Patent Literatures 1 and 2).

More specifically, Patent Literature 1 discloses an electronic dictionary with an image scanner, which can read character images with a pen-type scanner. This electronic dictionary with an image scanner can read character images with the scanner, thereby allowing for omitting the trouble of the key entry.

Moreover, Patent Literature 2 discloses an image capture and message display device that captures a character image with a camera and displays information regarding that captured character image. This image capture and message display device can obtain a character image by a camera, thereby being able to omit the trouble of the key entry.

However, with the electronic dictionary with the image scanner disclosed in Patent Literature 1, a character string may not be correctly recognized unless its roller is moved straight and without the roller idling. Accordingly, error recognition of characters may occur due to mishandling by the user.

On the other hand, the image capture and message display device disclosed in Patent Literature 2 is configured to carry out character recognition from the character image obtained by a camera. In a case in which character recognition is carried out from a character image captured by a camera, its recognition rate will not be 100%, due to external causes such as camera shake, image capturing environment and quality of imaging medium.

As such, with the techniques disclosed in Patent Literatures 1 and 2, there is a problem that when the characters are entered, error recognition of characters may occur.

Accordingly, Patent Literature 3 proposes a symbol recognition device that has the following configuration. Namely, the symbol recognition device consecutively captures images for an odd number of times of not less than three, and extracts a recognition result having a highest occurrence frequency from results of character recognition carried out to each of the images. Since it is configured to employ the recognition result that has the highest frequency out of consecutive images as such, the symbol recognition device can prevent the decrease in the recognition rate due to the external causes such as the camera shake, image capturing environment and quality of the imaging medium.

CITATION LIST

Patent Literature

Patent Literature 1
Japanese Patent Application Publication, Tokukaihei, No. 1-234977 A (Publication Date: Sep. 20, 1989)
Patent Literature 2
Japanese Patent Application Publication, Tokukai, No. 2000-20677 A (Publication Date: Jan. 21, 2000)
Patent Literature 3
Japanese Patent Application Publication, Tokukai, No. 2004-199141 A (Publication Date: Jul. 15, 2004)

SUMMARY OF INVENTION

Technical Problem

However, with the conventional art described above, there is the problem that the characters cannot be recognized quickly.

More specifically, with the symbol recognition device and the symbol recognition method disclosed in Patent Literature 3, image capture of a still image is carried out a plurality of times to apply the majority rule; this caused a problem that it takes a long time until a character to be retrieved is identified, from when the image is captured.

The present invention is accomplished to solve the foregoing problems, and an object thereof is to provide an information processing device, a method of controlling an information processing device, a control program of an information processing device, and a recording medium on which a control program of the information processing device is stored, each of which allows for recognizing characters from an image quickly.

Solution to Problem

In order to solve the foregoing problems, an information processing device according to the present invention is an information processing device that carries out word or phrase recognition from an image, the information processing device including: an image capturing section that captures a moving image; extraction means for (i) successively obtaining consecutive images that constitute the moving image captured by the image capturing section and (ii) extracting word and phrase information being information indicative of a word or a phrase at a predetermined position of the image; a storage section that stores the word and phrase information extracted by the extraction means; and determining means for determining, as a recognition result, a word or a phrase of a piece of the word and phrase information that is stored by the most number in the storage section.

According to the configuration, an image capturing section and extraction means are provided therein, thereby allowing for successively extracting word and phrase information from consecutive images that constitute a moving image, which word and phrase information is indicative of a word or a phrase in a predetermined position of those images. Namely, the word and phrase information can be extracted from the images that constitute a moving image; this allows for quickly obtaining a plurality of pieces of word and phrase information as compared to a configuration in which a plurality pieces of still images are obtained by a camera or the like.

The word and phrase information is information related to a word or a phrase at a predetermined position, and may be an identifier assigned to that word or phrase, or may be data being indicative of the actual word or phrase.

Moreover, since the configuration includes determining means, for example if even just one piece of word and phrase information is stored in a storage section in a state thereof in which no word and phrase information is stored, a word or phrase of that word and phrase information can be determined as a recognition result. Namely, the information processing device according to the present invention can quickly determine the recognition result of the word or phrase.

Hence, the information processing device according to the present invention brings about an effect that it is possible to recognize characters from an image quickly.

In order to solve the problems, a method according to the present invention of controlling an information processing device is a method of controlling an information processing device that includes an image capturing section and a storage section and that carries out recognition of words and phrases from an image, the method including the steps of: (a) capturing a moving image with use of the image capturing section; (b) successively obtaining consecutive images that constitute the moving image captured in the step (a) and extracting word and phrase information being information indicative of a word or phrase at a predetermined position of the image; (c) storing the word and phrase information extracted in the step (b) into the storage section; and (d) determining, as a recognition result, a word or a phrase of the piece of the word and phrase information that is stored by the most number in the storage section.

The foregoing method includes an extracting step, thereby allowing for successively extracting, from consecutive images constituting the moving image captured by the image capturing section, word and phrase information indicative of a word or a phrase at a predetermined position of the image. Namely, since the word and phrase information can be extracted from each of the images that constitute the moving image, it is possible to obtain a plurality pieces of the word and phrase information quickly as compared to for example obtaining a plurality of still images with use of a camera or the like.

The word and phrase information is information related to the word or phrase positioned at the predetermined position, and may be an identifier assigned to that word or phrase or may be data indicative of that actual word or phrase.

Moreover, since the method includes a determining step, for example if even just one piece of word and phrase information is stored in a storage section in a state thereof in which no word and phrase information is stored, a word or phrase of that word and phrase information can be determined as a recognition result. Namely, with the method according to the present invention for controlling the information processing device, it is possible to determine a recognition result of the word or phrase quickly.

Accordingly, the method according to the present invention of controlling the information processing device brings about an effect that characters can be recognized from an image quickly.

Advantageous Effects of Invention

As described above, the information processing device according to the present invention is an information processing device that carries out word or phrase recognition from an image, the information processing device including: an image capturing section that captures a moving image; extraction means for (i) successively obtaining consecutive images that constitute the moving image captured by the image capturing section and (ii) extracting word and phrase information being information indicative of a word or a phrase at a predetermined position of the image; a storage section that stores the word and phrase information extracted by the extraction means; and determining means for determining, as a recognition result, a word or a phrase of a piece of the word and phrase information that is stored by the most number in the storage section.

Hence, the information processing device according to the present invention brings about an effect of being able to recognize characters from an image quickly.

As described above, the method according to the present invention of controlling the information processing device is a method of controlling an information processing device that includes an image capturing section and a storage section and that carries out recognition of words and phrases from an image, the method including the steps of: (a) capturing a moving image with use of the image capturing section; (b) successively obtaining consecutive images that constitute the moving image captured in the step (a) and extracting word and phrase information being information indicative of a word or phrase at a predetermined position of the image; (c) storing the word and phrase information extracted in the step (b) into the storage section; and (d) determining, as a recognition result, a word or a phrase of the piece of the word and phrase information that is stored by the most number in the storage section.

Hence, the method according to the present invention of controlling the information processing device brings about an effect that it is possible to rapidly recognize characters from an image.

BRIEF DESCRIPTION OF DRAWINGS

FIG. 5 illustrates an embodiment of the present invention, and is a view illustrating an example of a dictionary table.

FIG. 8 illustrates an embodiment of the present invention, and is a view illustrating an example of (i) nodes in DP matching and (ii) a relationship of distances of paths between the nodes.

FIG. 9 illustrates an embodiment of the present invention, and is a view illustrating an example of a stored state of data in a FIFO buffer.

FIG. 10 illustrates an embodiment of the present invention, and is a view illustrating an example of a stored state of data in a FIFO buffer.

FIG. 11 illustrates an embodiment of the present invention, and is a view illustrating an example of a stored state of data in a FIFO buffer.

FIG. 12 illustrates an embodiment of the present invention, and is a view illustrating an example of a stored state of data in a FIFO buffer.

FIG. 13 illustrates an embodiment of the present invention, and is a view illustrating an example of a stored state of data in a FIFO buffer.

FIG. 15 illustrates an embodiment of the present invention, and is a view illustrating an example of a display state in which, to a word extracted from a character string in the vicinity of a predetermined position, a Japanese reading and its meaning of that word is provided.

FIG. 16 illustrates another embodiment of the present invention, and is a block diagram illustrating a software configuration of a portable phone, which software configuration is related to a dictionary function.

FIG. 18 illustrates another embodiment of the present invention, and is a view illustrating a display state in which, to a word extracted from a character string in the vicinity of a predetermined position, a Japanese reading and its meaning of that word is provided.

FIG. 19 illustrates another embodiment of the present invention, and is a view illustrating a display state in which, to a word extracted from a character string in the vicinity of a predetermined position, a Japanese reading and its meaning of that word is provided.

FIG. 26 illustrates another embodiment of the present invention, and is a view illustrating an example of a display screen for a user to select a function possessed by an information provider processing section.

DESCRIPTION OF EMBODIMENTS

Embodiment 1

One embodiment of the present invention is as described below, with reference to FIG. 1 through FIG. 13. A portable phone (information processing device) 1 according to the present embodiment is a telephone receiver carried by a user, which portable phone 1 is capable of calling other telephone receivers and sending and receiving e-mail with other telephone receivers, via a base station. This portable phone 1, in addition to the function of calling other telephone receivers (calling function) and the function of sending and receiving e-mails (e-mail function) as described above, further has a function of obtaining a still image or a moving image with an image capturing section 8 (image capture function). Furthermore, the portable phone 1 is capable of connecting to a communications network such as the Internet and communicating with other devices via the communications network.

The portable phone 1 according to the present embodiment is further configured so as to be capable of recognizing a specific word or phrase from the obtained moving image, and displaying a meaning and Japanese reading of that word or phrase in a superposed manner on the moving image (dictionary function) (details are described later).

The functions that the portable phone 1 has are not limited to the calling function, e-mail function, image capture function, and the dictionary function that are described above. For example, the portable phone 1 may be provided with an antenna for receiving broadcast waves, and have other functions such as a television function that outputs television broadcast based on broadcast waves received via the antenna.

Figure 2:
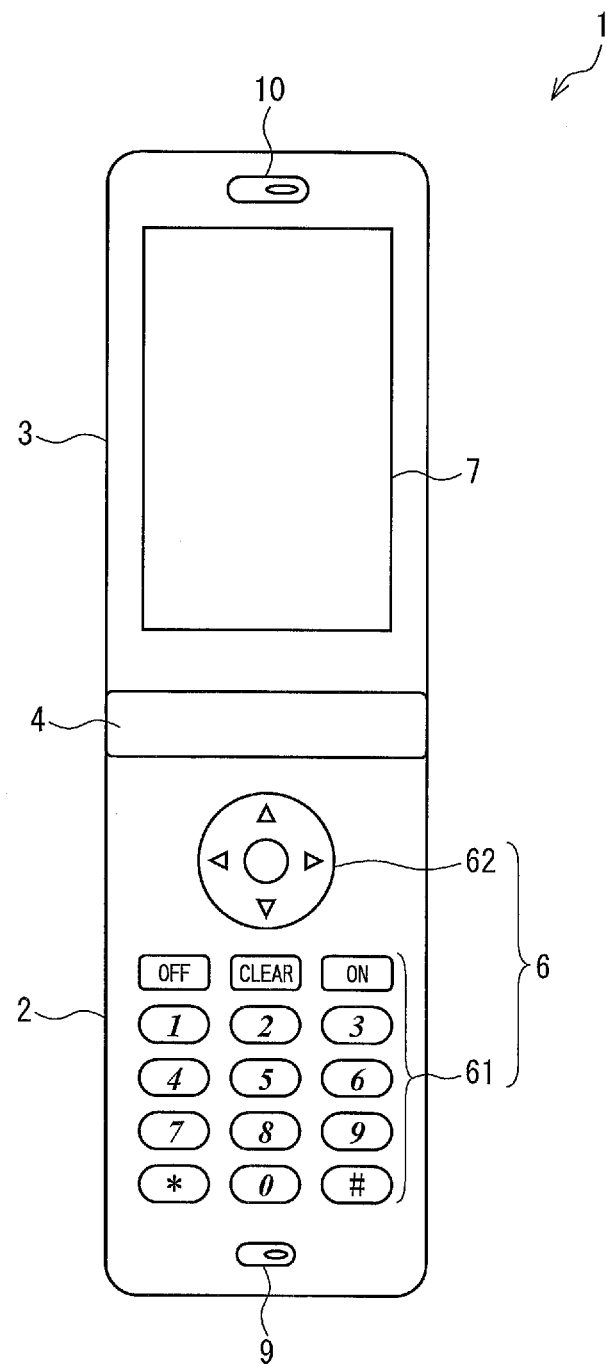
FIG. 2 illustrates an embodiment of the present invention, and is a view illustrating an example of an external appearance of a portable phone.
Figure 3:
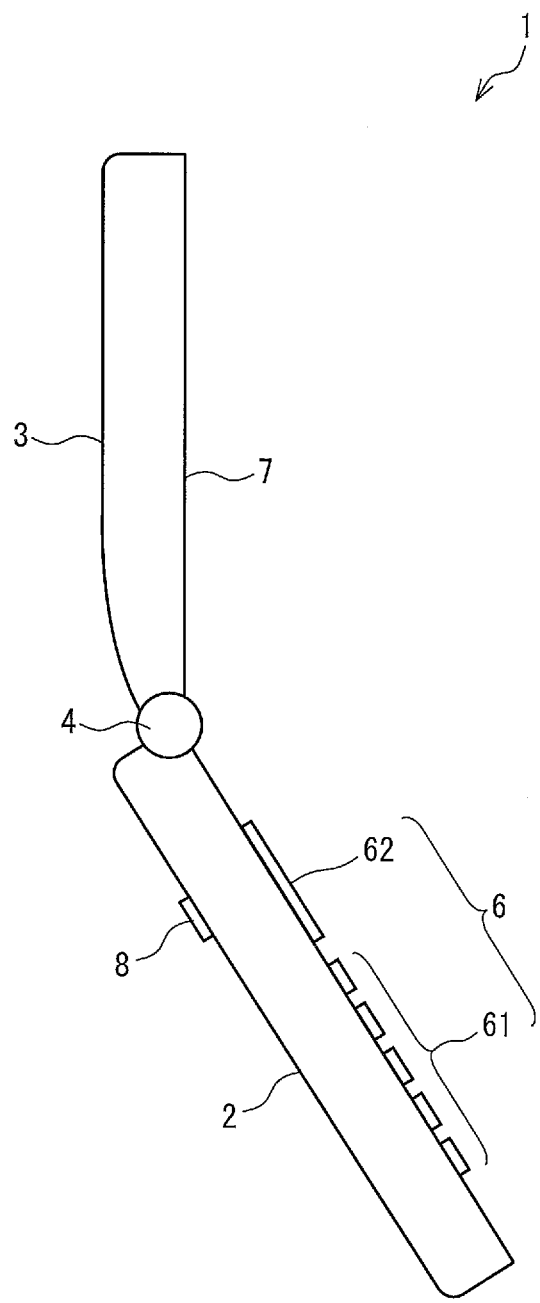
FIG. 3 illustrates an embodiment of the present invention, and is a view illustrating an example of an external appearance of a portable phone.

The portable phone 1 includes, as illustrated in FIGS. 2 and 3, an operational body 2 and a display screen section 3, which operational body 2 has an operation section 6 and a microphone 9 on its upper side, an image capturing section 8 on its rear side, and a communication antenna 5 (not illustrated in FIGS. 2 and 3) in its inside, and which display screen section 3 has a display section 7 and a speaker 10 on its upper side, and further a hinge 4 that connects the operational body 2 and the display screen section 3.

The display screen section 3 and the operational body 2 are wired therebetween, whereby allowing for control signals and the like outputted from the operational body 2 to be received by the display screen section 3. FIGS. 2 and 3 illustrate an embodiment of the present invention, and are views illustrating an example of an external appearance of the portable phone 1.

For instance, in a case in which a phone call is to be made to another telephone receiver, the portable phone 1 can output sound from the speaker 10 and input sound to the microphone 9. Moreover, the portable phone 1 enables input of various control instructions and the like via the operation section (operation receiving section) 6.

Furthermore, the portable phone 1 is configured so that digital contents such as text data indicative of various information, image data, and video, can be displayed on the display section 7.

The operation section 6 includes numeric keys 61 and an arrow key 62; in the present embodiment (Embodiment 1), settings of various information and instructions of starting and terminating various applications can be carried out with use of the numeric keys 61, the arrow key 62, or by a combination of these keys. The portable phone 1 according to the present embodiment, in addition, is configured to be capable of starting the image capturing section 8 by operating the operation section 6 and displaying a meaning and a Japanese reading of a specific word or phrase included in an obtained moving image.

The display section 7 is fabricated by, for example, an LCD (Liquid Crystal Display) or the like.

The image capturing section 8 is constituted of a CCD (charge coupled device) or a CMOS, and a moving image or a still image can be captured with the image capturing section 8. The image capturing section 8 can capture a video having 15 to 30 frames or more per one second. In the portable phone 1, a main control section 15 is made capable of analyzing the images (frames) of the moving image captured by the image capturing section 8, extracting a word or phrase at a predetermined position of the image, and outputting a Japanese reading and meaning of the extracted word or phrase (details thereof are described later).

(Hardware Configuration of Portable Phone)

Figure 4:
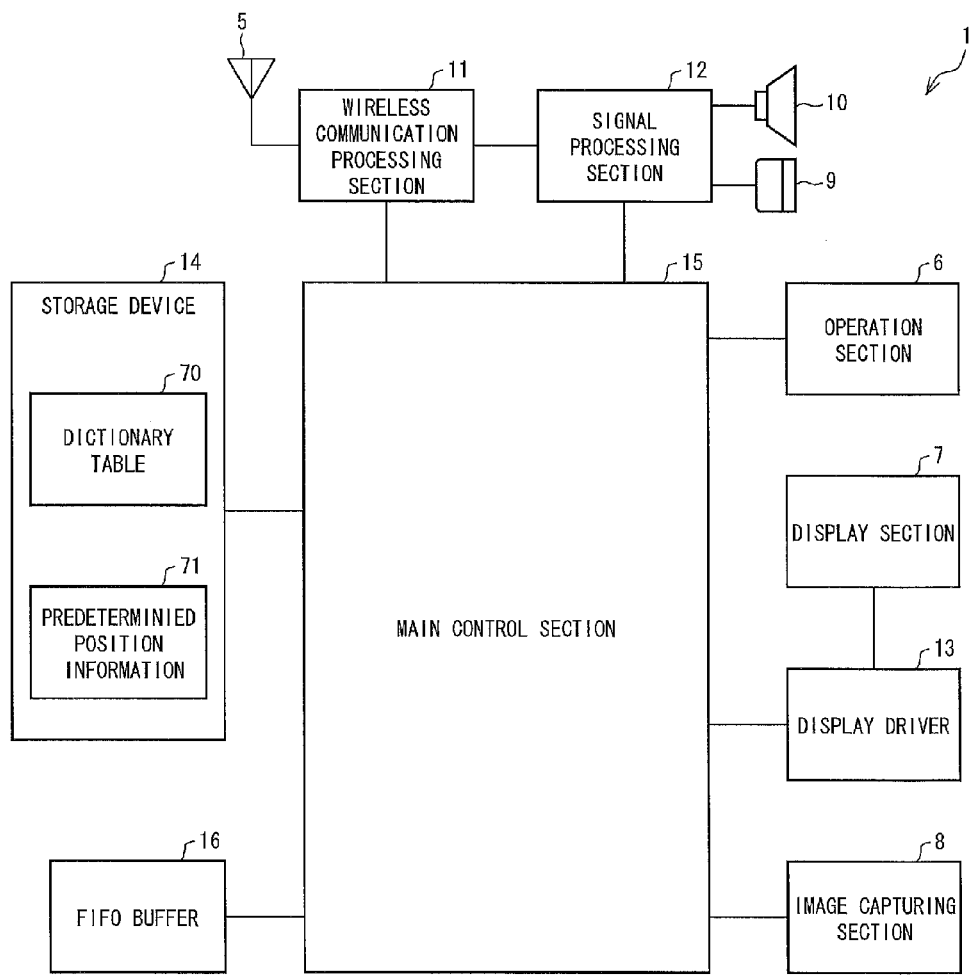
FIG. 4 illustrates an embodiment of the present invention, and is a block diagram illustrating an essential configuration of a portable phone.

Next described are details of a hardware configuration of the portable phone, with reference to FIG. 4. FIG. 4 illustrates an embodiment of the present invention, and is a block diagram illustrating an essential configuration of the portable phone 1.

As illustrated in FIG. 4, the portable phone 1 according to the present embodiment further includes, in addition to the hinge 4, the communication antenna 5, the operation section 6, the display section 7, the image capturing section 8, the microphone 9, and the speaker 10 described above, a wireless communication processing section 11, a signal processing section 12, a display driver 13, a storage device (list information storage device) 14, the main control section 15, and a FIFO buffer (storage section) 16.

First described are various pieces of information stored in the storage device 14. The storage device 14 is a random access storage device, and for example may be accomplished by a flash memory, a hard disc or the like. The storage device stores a dictionary table (list information) 70 and predetermined position information 71, as illustrated in FIG. 4.

The dictionary table 70 is a table including information regarding words and phrases extracted from images (frames) of the moving image, ID of those words and phrases, and Japanese readings and meanings of those words and phrases. The dictionary table 70 stores (a) the ID for identifying a respective word or phrase, (b) the words and phrases, and (c) the Japanese reading and meaning of the respective word or phrase, in an associated manner as illustrated in FIG. 5. FIG. 5 illustrates an embodiment of the present invention, and is a view illustrating an example of the dictionary table 70.

The predetermined position information 71 is information serving as a standard for determining the word or phrase for which the meaning and Japanese reading is outputted. More specifically, in the present embodiment, the predetermined position information 71 serves as information related to a position of a center coordinate in a display screen when the obtained image is displayed on the display section 7.

The main control section 15 performs various controls for sections provided in the portable phone 1, and is made of a CPU or the like. In a case in which the main control section 15 is accomplished by a CPU or the like, the CPU is capable of controlling the sections provided in the portable phone 1 by reading out and executing on a RAM or the like (not illustrated) a system program stored in a ROM or the like (not illustrated).

The portable phone 1 configured as such performs various functions, as described below. Namely, the portable phone 1 transmits to and receives from a base station (not illustrated) signals via the communication antenna 5 under transmission and reception control by the wireless communication processing section 11, and the signal processing section 12 performs a predetermined signal processing to the signal that is transmitted and received. This allows for the portable phone 1 to achieve the so-called calling function, i.e. output a sound received from a counter device (another telephone receiver) via the base station from the speaker 10, and send a sound inputted via the microphone 9 to the counter device via the base station.

Furthermore, the portable phone 1 can also accomplish the so-called e-mail function, i.e. sending and receiving e-mail data to and from the base station via the communication antenna 5, to receive e-mail data from and send e-mail data to a server or the like connected communicable with the base station.

Moreover, in response to a control instruction from the main control section 15, the image capturing section 8 is started, to obtain a still image or a moving image. Thereafter, the so-called image capture function is accomplished, in which the obtained still image or moving image is stored in the storage device 14, is outputted to the display driver 13 to be displayed on the display section 7, and the like.

In the case in which the image capturing section 8 starts to execute the dictionary function, an ID of a word or a phrase extracted from an image captured by the image capturing section 8 is inputted into the FIFO buffer 16, in response to the control instruction of the main control section 15.

The FIFO buffer 16 is a first in first out buffer, which inputs and outputs the ID of words and phrases extracted from an obtained image (frame) in an order of earlier stored ID, i.e. in the order that the ID stored earlier is outputted earlier.

When the portable phone 1 according to the present embodiment is to execute the dictionary function, the ID of the word or phrase extracted from the image is successively inputted into the FIFO buffer 16, in response to a control instruction from the main control section 15. Every time one image (frame) is inputted from the image capturing section 8, the main control section 15 extracts a word or a phrase from that image and stores an ID of the extracted word or phrase into the FIFO buffer 16. Thereafter, the word or phrase of the ID having a highest appearance frequency (ID of the most frequent value) out of the stored ID is retrieved in the FIFO buffer 16, and its Japanese reading and meaning are outputted to the display driver 13. The display driver 13 is configured to display the received Japanese reading and meaning on the display section 7 in a superposed manner on the moving image captured by the image capturing section 8. Details thereof are described later.

Figure 1:
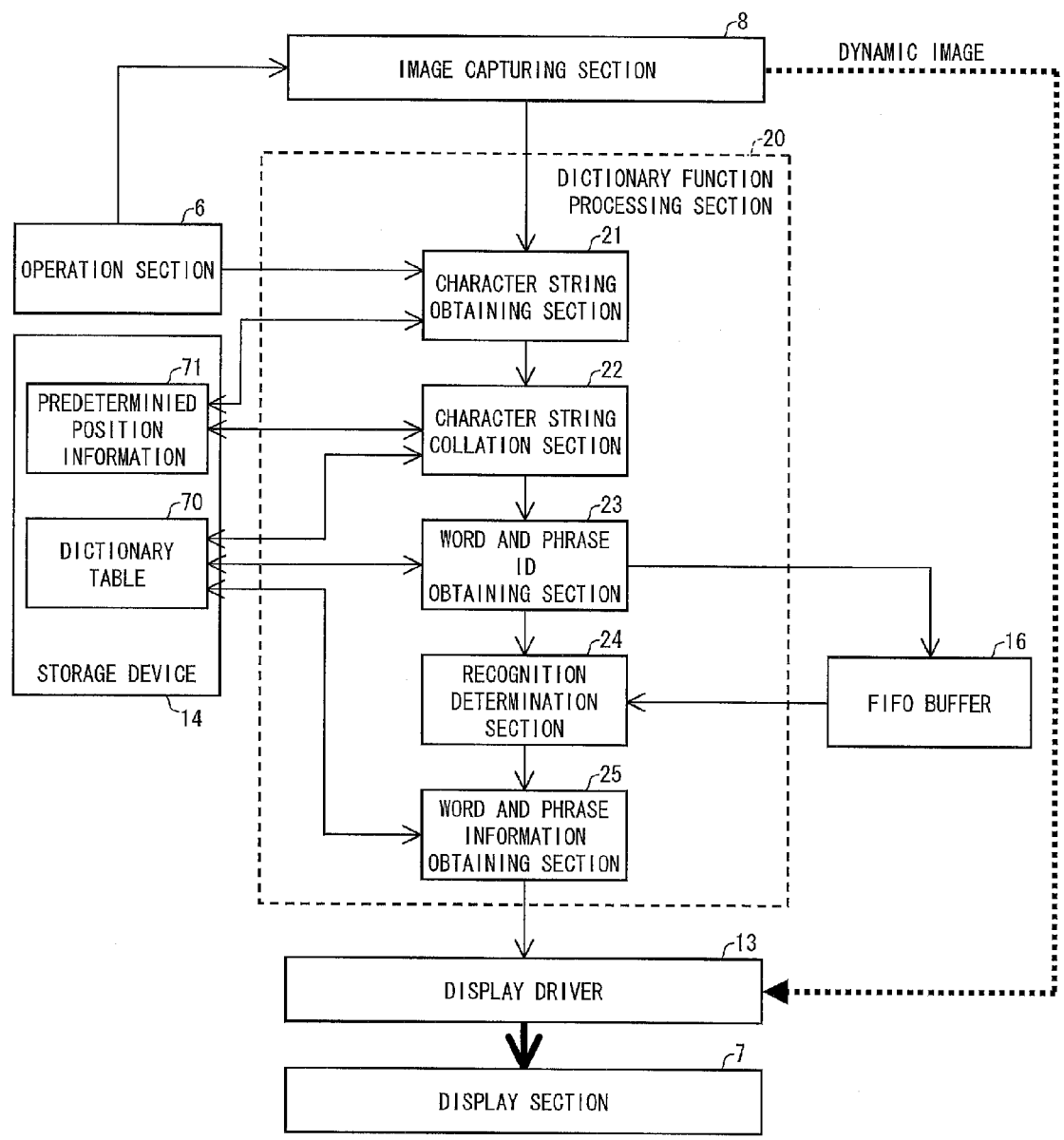
FIG. 1 illustrates an embodiment of the present invention, and is a block diagram illustrating a software configuration of a portable phone, which software configuration is related to a dictionary function.

Next described are details of the dictionary function in the portable phone 1 according to the present embodiment, described above. First described is the "software configuration related to dictionary function", with reference to FIG. 1. FIG. 1 illustrates an embodiment of the present invention, and is a block diagram illustrating a software configuration of the portable phone 1 related to the dictionary function.

(Software Configuration Related to Dictionary Function)

First described is the software configuration related to the dictionary function, with reference to FIG. 1. As illustrated in FIG. 1, the portable phone 1 according to the present embodiment includes a dictionary function processing section 20, which is a section in which the main control section 15 executes and processes the dictionary function. The dictionary function processing section 20 includes, as a functional block, a character string obtaining section (extraction means, character string extraction means) 21, a character string collation section (extraction means, word and phrase specifying means) 22, a word and phrase ID obtaining section (identifier obtaining means) 23, a recognition determination section (determining means) 24, and word and phrase information obtaining section (meaning and reading obtaining means, first output means) 25. These functional blocks, for example in a case in which the dictionary function processing section 20 can be accomplished by a CPU or the like, can be accomplished by the CPU reading out a program stored in a ROM (not illustrated) to a RAM (not illustrated) and executing that program. Moreover, the extraction means of the present invention is implemented by the character string obtaining section 21, the character string collation section 22, and the word and phrase ID obtaining section 23.

The character string obtaining section 21 carries out a recognition process of characters in each of consecutive images (frames) that constitute the moving image captured by the image capturing section 8, in response to an instruction from the operation section 6. Thereafter, the character string obtaining section 21 refers to the predetermined position information 71, and obtains a character string in which a predetermined position of the image is included, out of the recognized characters. Namely, the character string obtaining section 21 extracts lines based on line spacing and arrangements of characters, in each of the images of the moving image obtained by the image capturing section 8. Thereafter, the characters are captured to perform character recognition. The character string obtaining section 21 then further obtains the character string in which the predetermined position of the image is included.

Figure 6:
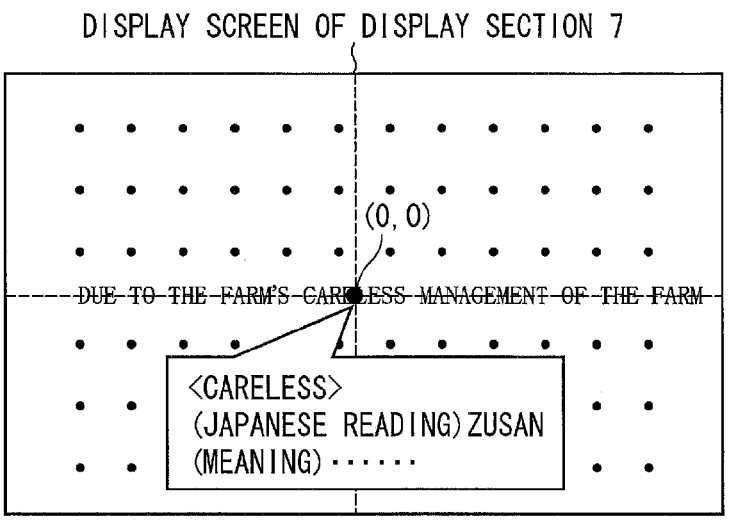
FIG. 6 illustrates an embodiment of the present invention, and is a view illustrating an example of a display state in which, to a word extracted from a character string in the vicinity of a predetermined position, a Japanese reading and its meaning of that word is provided.

In the present embodiment, the predetermined position of the image is a center coordinate position of a display screen when the obtained image is displayed on the display section 7. More specifically, in a case in which an image as illustrated in FIG. 6 is obtained for example, a center coordinate (0, 0) in the display screen of the display section 7 serves as the predetermined position. Accordingly, the character string including the predetermined position is the character string including the center coordinate, i.e. "DUE TO THE FARM'S CARELESS MANAGEMENT OF THE FARM". The character string obtaining section 21, upon obtaining the character string, sends this obtained character string to the character string collation section 22. FIG. 6 illustrates an embodiment of the present invention, and is a view illustrating a display state in which a Japanese reading and a meaning of a word extracted from the character string, in the vicinity of the predetermined position, is displayed with the extracted word.

The character string collation section 22 selects a word or a phrase from the character string obtained by the character string obtaining section 21, for which a meaning and Japanese reading thereof is displayed. The character string collation section 22 matches the character string obtained by the character string obtaining section 21 (input character string) with reference characters stored in the dictionary table 70, by use of DP (Dynamic Programming) matching. Thereafter, a word or phrase whose meaning and Japanese reading is to be outputted is specified out of the matched words and phrases (character string). More specifically, collation is carried out by use of the dictionary table 70, as described below.

Figure 7:
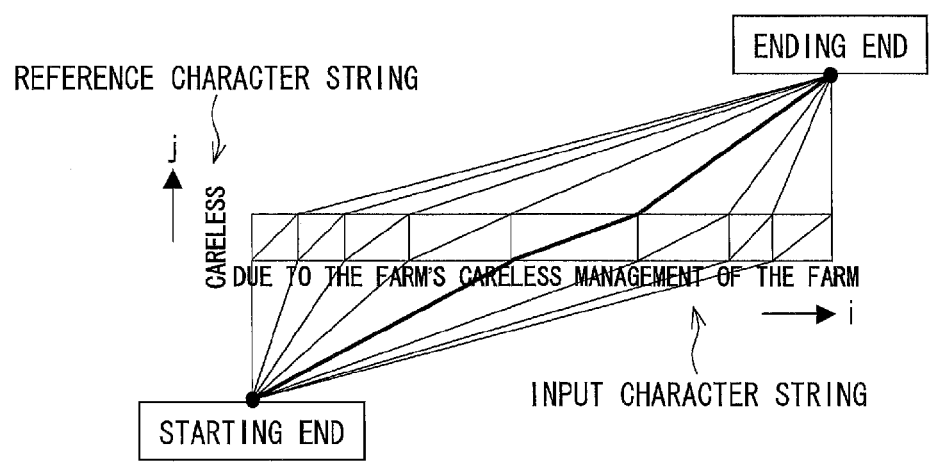
FIG. 7 illustrates an embodiment of the present invention, and is a view illustrating an outline of DP matching.

First described is an outline of the DP matching utilized in the present embodiment, with reference to FIG. 7. FIG. 7 illustrates an embodiment of the present invention, and is a view describing an outline of the DP matching. The DP matching in the character string collation, when retrieving a correspondence between the input character string and the reference characters, finds for a path having a minimum accumulated distance, as illustrated in FIG. 7. The accumulated distance is an accumulation of distances of nodes (intersection points) indicative of a matching degree of the input character string with the reference characters and distances of paths (sides) indicative of a correspondence between the input character string and the reference characters, each of when following a path from a starting end to an ending end.

The reference characters are one portion of the input character string. Hence, the starting end and the ending end are freely positioned, and a distance between nodes from the starting end to the ending end, and the distance between the path from the starting end and the path entering into the ending end are 0.

In a case in which a word or a phrase registered in the dictionary table 70 is retrieved from the input character string by the DP matching, the word or phrase to be retrieved does not have identical lengths. Accordingly, a word or phrase having a minimum quotient obtained by dividing the accumulated distance by the length of the word or phrase is retrieved. Assume that a character string obtained by the character string obtaining section 21 is "DUE TO THE FARM'S CARELESS MANAGEMENT OF THE FARM", as illustrated in FIG. 6, and the dictionary table 70 has the reference characters of "FARM", "CARELESS", and "MANAGEMENT" registered therein. In this case, all the words and phrases ("FARM", "CARELESS", "MANAGEMENT") would result in identical accumulated distances. When there are a plurality of words and phrases that have the same accumulated distances as such, the character string collation section 22 refers to the predetermined position information 71 and selects a word or phrase ("CARELESS") that is closest to the predetermined position on the display screen, in the present embodiment.

Moreover, assume that the character string obtained by the character string obtaining section 21 is a character string including "go as soon as possible", and the "predetermined position" is the position where "soon" is displayed. If "soon" is stored in the dictionary table 70 at this time, the accumulated distance of "soon" is 0, however if the phrase of "as soon as" is also stored in the dictionary table 70, the accumulated distance of this phrase would also be 0. When words or phrases with the same accumulated distances are found, the present embodiment is set so that the word or phrase having a longer length is given higher priority. Accordingly, the character string collation section 22 extracts the phrase "as soon as", from the character string obtained by the character string obtaining section 21. This allows for the user to obtain their desired meaning (Japanese term) without worrying about which of "as" or "soon" the dictionary should be looked up by.

Next describes details of the DP matching utilized in the present embodiment, with reference to FIG. 8. FIG. 8 illustrates an embodiment of the present invention, and is a view illustrating an example of (i) nodes in DP matching and (ii) a relationship of distances of paths between the nodes.

F(i, j), indicative of an accumulated distance in node (i, j), can be obtained by the following numerical formula (1):

Math. 1

$$F(i, j) = d(i, j) + \min\begin{Bmatrix} F(i-1, j) + q(i-1, j) \\ F(i-1, j-1) \\ F(i, j-1) + p(i, j-1) \end{Bmatrix} \quad (1)$$

In the formula (1), d(i, j) is a distance (matching degree) between the input character string and the reference character at node (i, j). This distance may be set as having two values, being "0" in a case of complete matching and being "K" in a case of not matching. Alternatively, the distance may be configured so that with similar characters such as "SHRINE" and "FOREST" for example, although the characters do not match, a value smaller than the other not matching characters (value closer to "0") is set. Moreover, the configuration may be one which sets a similar value for candidate characters in second place or lower, in a case in which character recognition is carried out by the character string obtaining section 21.

Moreover, in the formula (1), q(i−1, j) is a distance of a path from the node (i−1, j) to the node (i, j), and this path corresponds to a case in which the input character string is overlapped or includes rubbish. The p(i, j−1) is a distance of a path from the node (i, j−1) to the node (i, j), and this path corresponds to a case in which the input character string includes an omission. The path from the node (i−1, j−1) to the node (i, j) corresponds to a case in which the input character string corresponds to the reference character string, so therefore the distance of the path in the formula (1) is 0. Since the recognition rate of the character recognition is not 100%, there may be cases in which characters are excessively recognized or in which characters are omitted, however by use of the DP matching, it is possible to find an accumulated distance of the input character string with the reference character string by taking into account such points. Note that a blank character (space) is different from other characters, and no shape of a character but just a space between characters is recognized. Accordingly, the excess recognition or omission easily occurs. On this account, q(i−1, j) may be set as a smaller value than usual when the input character of the node (i, j) is a blank character (space) and the reference character is anything else other than the blank character, and p(i, j−1) may be set as a smaller value than usual when the reference character of the node (i, j) is a blank character and the input character is anything else other than the blank character, to reduce the effect of error recognition of the blank character. In the present embodiment, a model of FIG. 13 and formula 1 was used for the DP matching, however another model may also be used. The character string collation section 22, upon selecting the word or phrase for which the meaning and Japanese reading of the character string obtained by the character string obtaining section 21 is to be displayed, notifies information of the selected word or phrase to the word and phrase ID obtaining section 23.

As described, in the portable phone 1 according to the present embodiment, the character string collation section 22 matches the character string (input character string) obtained by the character string obtaining section 21 with the reference characters stored in the dictionary table 70, by the DP (Dynamic Programming) matching. Namely, the DP matching is used for extracting a character string that is closest to a character string stored in the dictionary table 70, from the input character string that includes errors of various causes such as misrecognition in the character recognition, splitting of characters caused by erroneous cutting out of characters, and omission of the characters. Hence, even with the input character string including the errors, a similarity (distance between compared character strings) is calculated and collated, thereby allowing for extracting a word or a phrase from the dictionary table 70 which word or phrase is closest to the recognition result of the character.

In the present embodiment, the series of processes of (i) the character string obtaining section 21 obtaining a character string from an image, (ii) the character string collation section 22 selecting words and phrases from the obtained character string which match the reference characters stored in the dictionary table 70, and (iii) specifying a word or phrase out of the selected words and phrases for which its meaning and reading is outputted, is called recognition processing of a word or a phrase.

The word and phrase ID obtaining section 23, upon receiving from the character string collation section 22 a notification of information regarding the selected word or phrase, reads out an ID of that word or phrase from the dictionary table 70, and outputs this ID to the FIFO buffer 16. The word and phrase ID obtaining section 23, when outputting the ID of the selected word or phrase to the FIFO buffer 16, sends timing information that notifies of its output timing, to the recognition determination section 24.

The recognition determination section 24, after receiving the timing information from the word and phrase ID obtaining section 23, obtains an ID stored in the FIFO buffer 16 by a most number, out of the ID stored in the FIFO buffer 16. Namely, the recognition determination section 24 obtains the ID with a most frequent value by comparing appearance frequencies of ID in the FIFO buffer 16. Thereafter, the word corresponding to the obtained ID is determined as a recognition result according to the recognition processing of the word or phrase. The recognition determination section 24 notifies the ID of the word or phrase that is determined as the recognition result, to the word and phrase information obtaining section 25. Details of the "determination process of recognition result of word or phrase" by the recognition determination section 24 are as described later.

The word and phrase information obtaining section 25, in response to the notification from the recognition determination section 24, obtains a Japanese reading or meaning that corresponds to the ID of the received word or phrase, from the dictionary table 70. The word and phrase information obtaining section 25 sends the obtained Japanese reading or meaning to the display driver 13. Thereafter, the word and phrase information obtaining section 25 instructs the display driver 13 to display the Japanese reading or the meaning of that word or phrase in a superposed manner on the corresponding word or phrase that is displayed in the moving image obtained by the image capturing section 8. The display driver 13 controls, in response to the instructions from the word and phrase information obtaining section 25, to display the meaning or the Japanese reading for the word or phrase that is provided on the predetermined position together with the word or phrase, as illustrated in FIG. 6.

(Determination Process of Recognition Result of Word or Phrase)

Next described is the foregoing "determination process of recognition result of word or phrase", with reference to FIGS. 9 through 13. Note that the FIFO buffer 16 provided in the portable phone 1 according to the present embodiment is described as one having a depth of 8 for storing data. Moreover, FIG. 9 through FIG. 13 each illustrates an embodiment of the present invention, and are views illustrating an example of a data storage state in the FIFO buffer 16.

The FIFO buffer 16 includes no ID of words or phrases received from the word and phrase ID obtaining section 23 in its initial state, so a column (storage region) that is to store an ID is all set as "0", as illustrated in FIG. 9. In the present embodiment, the ID being "0" indicates that there is no ID of a word or a phrase received from the word and phrase ID obtaining section 23, and means that there is "no recognized word or phrase".

Assume that the image capturing section 8 obtains an image of one frame, and the word and phrase ID obtaining section 23 obtains, based on a recognition process of a word or a phrase carried out to this image by the character string obtaining section 21 and character string collation section 22, an ID (="2222") of a word or phrase on a predetermined position of the image. The word and phrase ID obtaining section 23 outputs this obtained ID to the FIFO buffer 16, which causes the FIFO buffer 16 to become in a state as illustrated in FIG. 10. Namely, the "0" stored in a position in which an output order is first is outputted, and the "0" stored in positions corresponding to output orders of second to eighth are moved up to positions of output orders of first to seventh, respectively. Thereafter, the ID received from the word and phrase ID obtaining section 23 is stored in the position in which the output order is eighth. FIG. 9 and FIG. 10 illustrate an embodiment of the present invention, and illustrate examples of a data storage state in the FIFO buffer 16.

In the state in which the data (ID of word or phrase) is stored as such, the recognition determination section 24 obtains an ID of the most number, out of the ID stored in the FIFO buffer 16. At this time, the value "0" of the stored values is ignored. Hence, the ID of the most number out of the ID stored in the FIFO buffer 16 at this point is "2222". Accordingly, the recognition determination section 24 obtains "2222" as the recognition result of the word or phrase.

As such, the portable phone 1 according to the present embodiment, once the image capturing section 8 obtains a new image, can immediately output and display on the display section 7 the Japanese reading or the meaning of the character recognized in that image.

The recognition result obtained as a result of the recognition process of the word or phrase carried out to each of the images that constitute the moving image obtained by the image capturing section 8 cannot be said as always accurate, and there may be cases in which an inappropriate word or phrase is obtained from a wrong character string, as a result of the recognition process. For example, assume that the portable phone 1 consecutively obtains an image containing a word or phrase with the ID of "2222" on its predetermined position. However, there may be cases in which, out of one of several images, the recognition process of a word or phrase may mistakenly recognize the word in the predetermined position as a word or phrase with an ID of "1212", which causes the ID stored in the FIFO buffer 16 to be, for example, as illustrated in FIG. 11. FIG. 11 illustrates an embodiment of the present invention and is an example of a data storage state in the FIFO buffer 16.

The recognition determination section 24 here is configured to determine an ID of the most number out of the ID stored in the FIFO buffer 16, as a recognition result of the character string recognition. Hence, as illustrated in FIG. 11, even if the ID stored in the FIFO buffer 16 include an erroneous recognition result obtained by the character string obtaining section 21, the recognition determination section 24 can determine the ID of the most number out of the ID stored in the FIFO buffer 16 as the recognition result of the word or phrase.

Accordingly, the portable phone 1 according to the present embodiment is capable of stably displaying a meaning or a Japanese reading of a word or phrase displayed in the predetermined position of the display screen.

In the foregoing description, the image capturing section 8 starts capturing a moving image from a state in which no recognition process of the word or phrase is carried out. After a word or phrase in the predetermined position of an image of one frame worth is obtained and an ID corresponding to that word or phrase is stored in the FIFO buffer 16, that word or phrase is then determined as a recognition result.

However, as described above, the recognition result of the recognition process of a word or phrase in the portable phone 1 according to the present embodiment may include an error. Accordingly, in a case in which the recognition result of the recognition process of the word or process carried out to an image initially received from the image capturing section 8 is an error, the portable phone 1 would display this erroneous Japanese reading and its meaning.

In order to allow for stably displaying the accurate Japanese reading and meaning of the word or phrase, a lower limit may be provided for the most frequent value of the ID to be determined as a recognition result, with the ID stored in the FIFO buffer 16. More specifically, for example, unless the FIFO buffer 16 stores at least three common ID (unless the most frequent value is at least three), this ID being the most frequent value is not obtained, so that no recognition result of the word or phrase is determined.

Moreover, the above described a determining process of a recognition result regarding a specific word or phrase displayed on a predetermined position. The portable phone 1 can change the image-captured position to any position, so of course a word or phrase displayed in the predetermined position is also changeable.

The following describes a determination process of a recognition result carried out in line with a change in a subject that the recognition process of the character string (word or phrase) is to be carried out.

First, a presupposition is that a user holds the portable phone 1 so that a character string of "CARELESS" (ID of word is "2222") is displayed on the predetermined position of the display screen in the display section 7. The image-captured position of the image capturing section 8 is changed from this state, and the user moves the portable phone 1 so that a word "MANAGEMENT" (word or phrase ID="1111") is displayed on the predetermined position in the display screen.

In line with this change of the image-captured position, the storage state of the ID stored in the FIFO buffer 16 changes over, as shown in FIG. 12 and FIG. 13. Namely, as illustrated in FIGS. 12 and 13, as the ID "1111" of the word or phrase is newly inputted into the FIFO buffer 16, the ID "2222" of the word stored beforehand is outputted. In other words, when approximately half of the 1 through 8 in FIG. 12, i.e. 5 through 8, is rewritten into "2222", the number of the word or phrase with the I D "1111" changes in number so that the number of the word or phrase of the ID "1111" surpass the number of the word or phrase stored with the ID of "2222". When the number of the word or phrase having the ID of "1111" surpasses the number of the word or phrase having the ID of "2222" in the FIFO buffer 16, the meaning and Japanese reading of the word having the ID of "1111" is rewritten into a display of the meaning and the Japanese reading of the word having the ID of "2222".

(Processes Carried Out Related to Dictionary Function)

Figure 14:
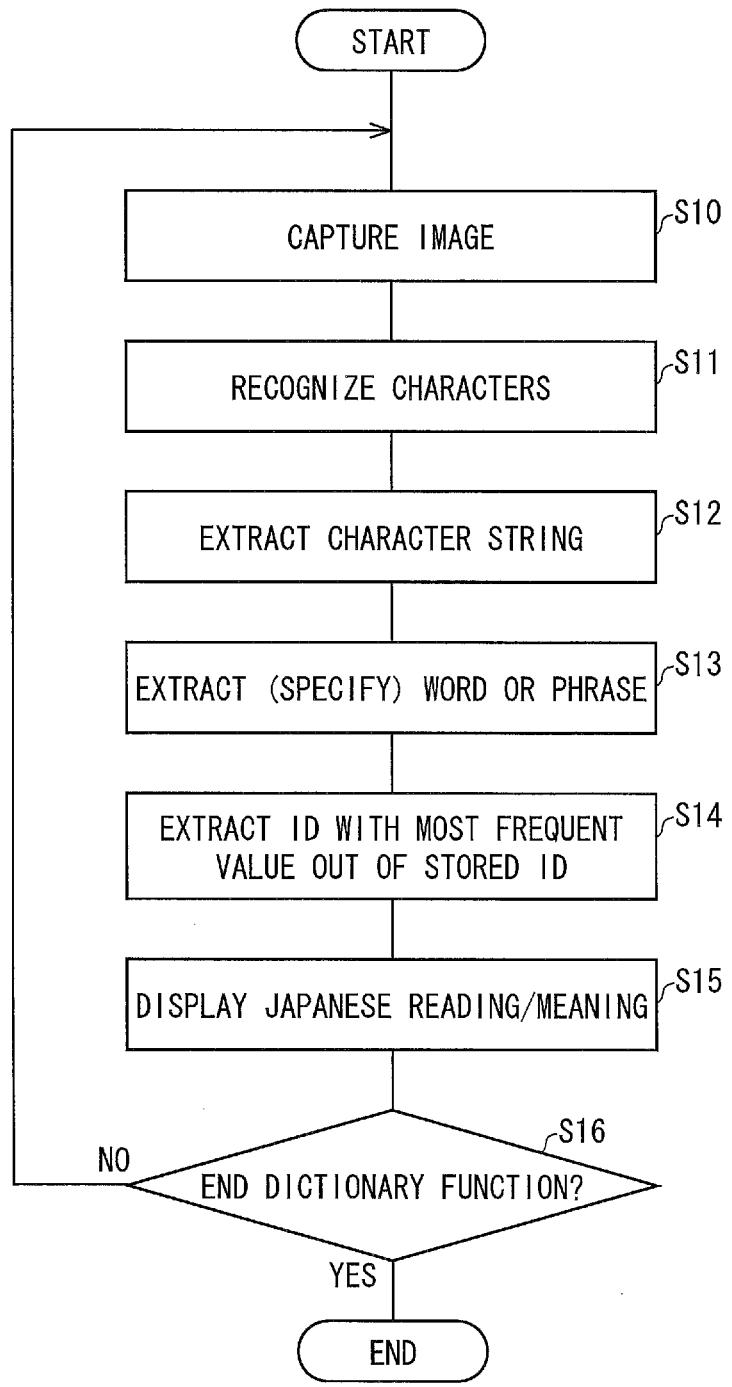
FIG. 14 illustrates an embodiment of the present invention, and is a flowchart illustrating an example of processes carried out, which are related to a dictionary function.

The following describes processes carried out that are related to the dictionary function, in the portable phone 1 having the foregoing configuration, with reference to FIG. 14. FIG. 14 illustrates an embodiment of the present invention, and is a flowchart illustrating an example of processes carried out that are related to the dictionary function.

First, the image capturing section 8 starts to capture images. That is to say, the user operates the operation section 6 of the portable phone 1 to (i) start the image capturing section 8 and (ii) instruct the main control section 15 to execute a dictionary function. Thereafter, the user moves the portable phone 1 so that a word or phrase for which its meaning and Japanese reading is desirably displayed is displayed in the predetermined position on the display screen of the display section 7.

As such, the image capturing section 8 captures a moving image so that the desired word or phrase is displayed in the predetermined position on the display screen of the display section 7 (step S10, hereinafter shown as S10). The image capturing section 8 outputs the captured moving image to the character string obtaining section 21 per consecutive image (frame) that constitutes the moving image.

The character string obtaining section 21, in response to the instruction from the operation section 6, carries out character recognition to the images received from the image capturing section 8 (S11), and recognizes a character string that includes the predetermined position, based on the recognition result of the character recognition (S12). Namely, the character string obtaining section 21 extracts a line in the images of the moving image obtained by the image capturing section 8, based on line spaces and arrangement of the characters. Thereafter, the characters are cut out and recognition of these characters is carried out. Furthermore, the character string obtaining section 21 obtains from the image the character string including the predetermined position. The character string obtaining section 21, upon obtaining the character string, sends this obtained character string to the character string collation section 22.

The character string collation section 22 matches the character string (input character string) extracted from the character string obtaining section 21 with reference characters stored in the dictionary table 70, by the DP matching. Thereafter, a word or phrase for which its meaning and Japanese reading is outputted is specified out of the matched words and phrases (S13). The character string collation section 22 sends a notification of information related to the specified word or phrase to the word and phrase ID obtaining section 23.

The word and phrase ID obtaining section 23, upon receiving the notification from the character string collation section 22, reads out the ID of the notified word or phrase from the dictionary table 70, and outputs that to the FIFO buffer 16. The word and phrase ID obtaining section 23, when outputting the ID of the selected word or phrase to the FIFO buffer 16, sends to the recognition determination section 24 timing information that notifies its output timing.

The recognition determination section 24, after receiving the timing information from the word and phrase ID obtaining section 23, obtains an ID of the most number out of the ID stored in the FIFO buffer 16. Namely, the recognition determination section 24 obtains an ID having a most frequent value as compared to an appeared frequency of ID in the FIFO buffer 16 (S14). Thereafter, the word or phrase corresponding to the obtained ID is determined as a recognition result of the word or phrase, and notifies the ID of the determined word or phrase to the word and phrase information obtaining section 25.

The word and phrase information obtaining section 25, in response to the notification from the recognition determination section 24, obtains from the dictionary table 70 a Japanese reading and meaning corresponding to the word of the received ID, and sends this to the display driver 13. Thereafter, the display driver 13 causes the display section 7 to display the meaning or Japanese reading of the word that is received from the word and phrase information obtaining section 25 (S15).

At this time, while no termination instruction of the dictionary function is inputted by the user via the operation section 6, i.e. while step S16 is "NO", the processes from step S10 to step S15 are repeated. On the other hand, when the termination instruction of the dictionary function is inputted via the operation section 6, i.e. when step S16 is "YES", the image capturing section 8 is terminated in its activation, and the execution of the dictionary function is terminated.

Embodiment 2

Next described is the portable phone 1 according to Embodiment 2, with reference to FIG. 16 through FIG. 23. The portable phone 1 according to Embodiment 2 differs in a point that the portable phone 1 is configured in such a manner that, while a predetermined operation button of the operation section 6 is pressed down when the recognition process of the character string is carried out in the portable phone 1 according to Embodiment 1, a stable recognition result is attainable even if the imaged position of the image capturing section 8 shifts to some extent. Moreover, the portable phone 1 according to Embodiment 2 differs also in a point that the portable phone 1 is configured so as to enable generation of a combined character string in which a character string in a beginning of a line and a character string in an end of a line are joint, when the word or phrase whose meaning and Japanese reading is to be outputted is split due to a start of a new line, and to enable extracting of a word or phrase from this combined character string.

More specifically, the portable phone 1 according to Embodiment 2 differs in its configuration from the configuration of the portable phone 1 according to Embodiment 1 in that it further includes a button pressing detection section (entry detecting means) 26, as illustrated in FIG. 16. FIG. 16 illustrates another embodiment of the present invention, and is a block diagram illustrating a software configuration of the portable phone 1, which software configuration is related to the dictionary function.

The button pressing detection section 26 detects a pressed state of a predetermined operation button in the operation section 6. When the button pressing detection section 26 detects that the predetermined operation button is in a pressed state, that detection result is sent to the character string obtaining section 21.

Moreover, the portable phone 1 according to Embodiment 2 differs in a point of including a memory (character string storage device) 17 that temporarily stores, upon receiving the detection result from the button pressing detection section 26 that the predetermined operation button is in the pressed state, a character string that includes the predetermined position, which character string is obtained from the image obtained by the character string obtaining section 21. Furthermore, the portable phone 1 is different in a point that in a case in which the character string is already stored and a further new character string is obtained, the portable phone 1 generates a combined character string that combines the stored character string with the new character string.

Any other points in the portable phone 1 according to Embodiment 2 are similar to those of the portable phone 1 according to Embodiment 1. Hence, such members that are identical to those illustrated in Embodiment 1 are provided with identical reference signs, and their explanations have been omitted.

Figure 17:
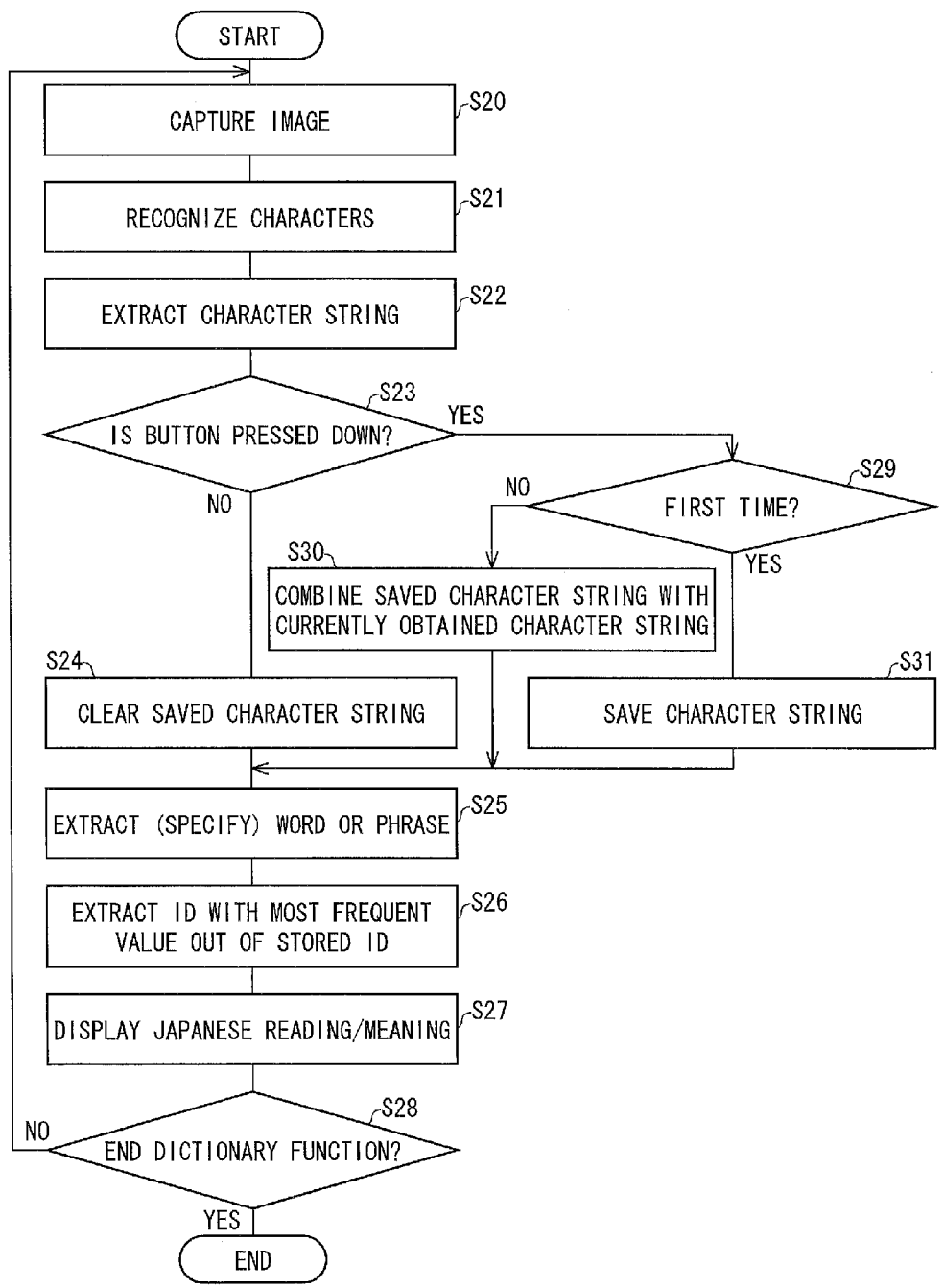
FIG. 17 illustrates another embodiment of the present invention, and is a flowchart illustrating an example of processes carried out, which are related to a dictionary function.

Next described are execution processes of the dictionary function by the portable phone 1 according to Embodiment 2, with reference to FIG. 17. FIG. 17 illustrates another embodiment of the present invention, and is a flowchart illustrating an example of processes that are related to the dictionary function.

Note that the processes from step S20 to step S22 are identical to those of step S10 to step S12 illustrated in FIG. 14, respectively. Moreover, the processes from steps S25 to S28 are identical to those of steps S13 to S16 illustrated in FIG. 14, respectively. Hence, descriptions of these processes have been omitted.

The character string obtaining section 21, upon obtaining a character string from an image inputted from the image capturing section 8, determines whether or not the operation button is pressed down based on a detection result received from the button pressing detection section 26 (S23).

For example, in a case in which a character string including the predetermined position of the image inputted from the image capturing section 8 is "THIS YEAR'S HOKKAI" as illustrated in FIG. 18, the character string obtaining section 21 extracts in step S22 a character string of "THIS YEAR'S HOKKAI". Thereafter, the character string obtaining section 21 determines whether or not the operation button is pressed down. FIG. 18 illustrates another embodiment (Embodiment 2) of the present invention, and is a view illustrating an example of a display state in which, to a word or phrase extracted from a character string, which word or phrase is in the vicinity of a predetermined position, a Japanese reading and its meaning of that word is provided together with that word or phrase.

When step S23 is "NO", the character string obtaining section 21 confirms whether or not the character string obtained from a previous image is saved in the memory 17. When the saved character string is stored, this character string is deleted (S24). Furthermore, a character string obtained from the received image is sent to the character string collation section 22. Subsequently, the processes from steps S25 to S28 are carried out.

On the other hand, when the character string obtaining section 21 determines, based on the detection result from the button pressing detection section 26 that the operation button is pressed down ("YES" in step S23), the character string obtaining section 21 confirms whether or not the obtaining process of a current character string is a first process carried out under the circumstance that the operation button is being pressed down. Namely, the character string obtaining section 21 confirms whether or not there already is a character string that is saved in the memory 17 under a situation that the operation button is being pressed down (S29).

When step S29 is "YES", the character string obtaining section 21 saves the obtained character string in the memory 17 (S31), and sends this to the character string collation section 22. For example, when the character string including the predetermined position is the character string illustrated in FIG. 18, the character string obtaining section 21 saves the character string of "THIS YEAR'S HOKKAI" into the memory 17, and sends this character string to the character string collation section 22. After the character string obtaining section 21 sends the character string to the character string collation section 22, the processes from step S25 to step S28 are carried out.

On the other hand, when step S29 is "NO", namely when the memory 17 includes a character string already saved, this already saved character string is combined with the character string that is currently obtained (S30). Thereafter, the character string obtaining section 21 sends this combined character string to the character string collation section 22. Subsequently, the processes in steps S25 to S28 are carried out.

For example, assume that after the character string of "THIS YEAR'S HOKKAI" is saved in the memory 17 in step S31, steps S20 to S22 are further carried out to a subsequent frame, whereby a new character string is obtained. In this case, the character string obtaining section 21 combines the character string that is currently obtained with the character string of "THIS YEAR'S HOKKAI" that is already saved based on the predetermined position.

Figure 20:
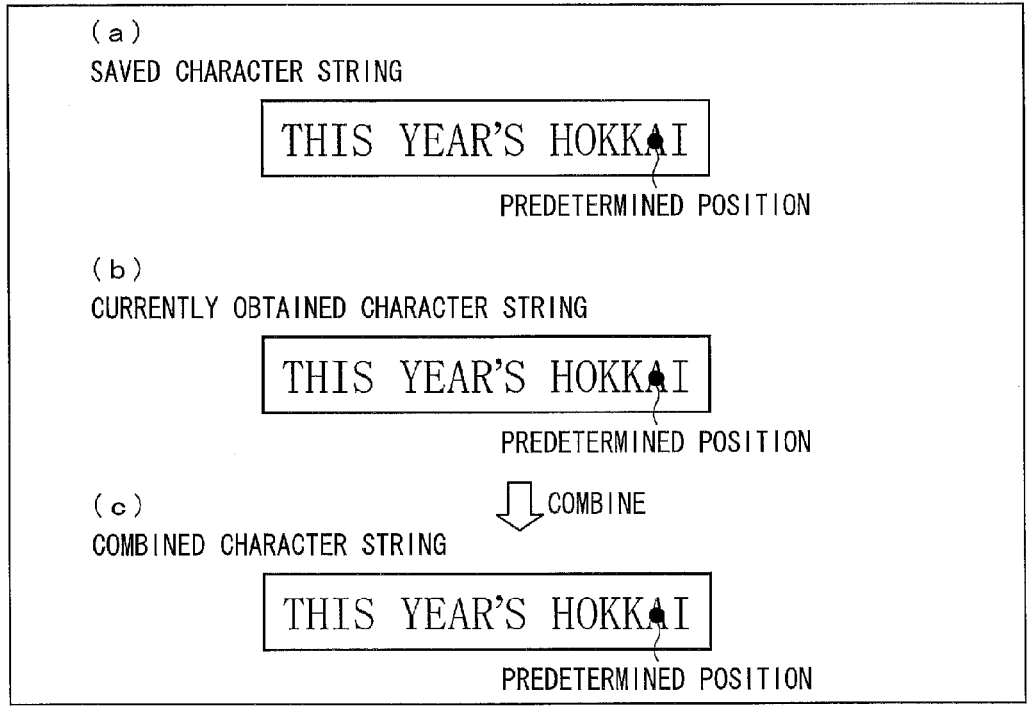
FIG. 20 illustrates another embodiment of the present invention, and is a view illustrating a relationship between (a) a stored character string, (b) a currently obtained character string, and (c) a combined character string combining these two character strings together.

For example, in a case in which the user captures a video with the operation button being pressed down while the posture of when the already saved character string was obtained is maintained, the already saved character string and the currently obtained character string will be substantially identical as illustrated in FIG. 20, and their combined character string will be one which overwrites the currently obtained character string with the already saved character string, based on the predetermined position.

The overwriting in the present embodiment does not mean to replace the already saved character string with the currently obtained character string. The overwriting denotes aligning of the currently obtained character string and the saved character string based on the predetermined position, and just parts of the currently obtained character string and the saved character string that overlap each other are overwritten. It is assumable with the character string already obtained and the currently obtained character string of a case in which, as a result of aligning the character strings based on the predetermined position, dispositions of the characters that constitute the character strings do not overlap each other. In such a case, the portable phone 1 according to the present embodiment is configured so that the already obtained character string is superposed on the currently obtained character string for overwriting, to create a combined character string.

In a case in which the portable phone 1 is configured so that the character string at the time in which the operation button is pressed down is always obtained by the character string obtaining section 21, the configuration may be one in which an obtained character string is always replaced with the already saved character string, while the situation is that the operation button is being pressed down.

FIG. 20 illustrates another embodiment (Embodiment 2) of the present invention, and is a view illustrating a relationship between the saved character string, the currently obtained character string, and a combined character string in which these character strings are combined.

The character string obtaining section 21 outputs the combined character string to the character string collation section 22. The character string collation section 22 extracts from the combined character string a word or phrase that is in the predetermined position. In the example of FIG. 20, the predetermined position is "KAI"; since a word "HOKKAI" is stored as a reference character in the dictionary table 70, the word extracted is "HOKKAI".

Figure 21:
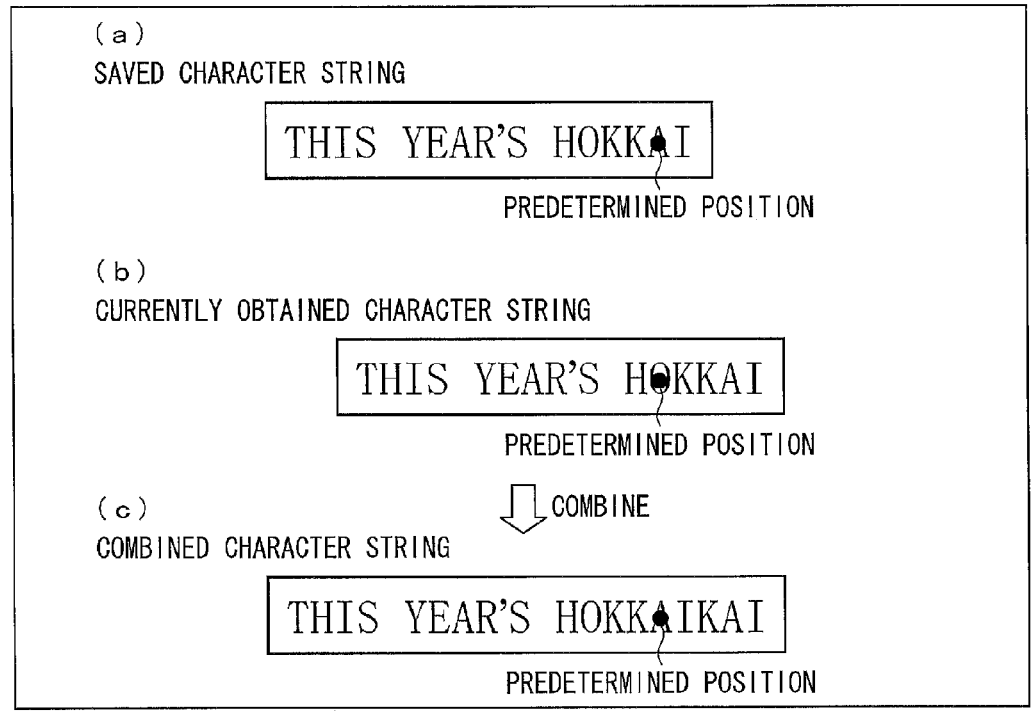
FIG. 21 illustrates another embodiment of the present invention, and is a view illustrating a relationship between (a) a stored character string, (b) a currently obtained character string, and (c) a combined character string combining these two character strings together.

On the other hand, in a case in which the user captures an image while pressing down the operation button in a posture changed from that when the already saved character string was obtained and moves the image-captured position so that the predetermined position moves to the position of "HOK", the image captured becomes as illustrated in FIG. 21. FIG. 21 illustrates another embodiment (Embodiment 2) of the present invention, and is a view illustrating a relationship of the saved character string, a currently obtained character string, and a combined character string that combines these character strings.

Namely, the character string currently obtained is of a position in which the predetermined position is shifted to the left than that of the saved character string. Accordingly, the combined character string becomes a character string in which the saved character string is overwritten on the currently obtained character string based on the predetermined position, i.e. "THIS YEAR'S HOKKAI". Since the dictionary table 70 does not include a character string of "HOKKAIKAI", the character string collation section 22 extracts the characters of "HOKKAI" even if the combined character string is "THIS YEAR'S HOKKAIKAI".

As such, the portable phone 1 according to Embodiment 2 can fix the word or phrase to be extracted even in a case in which the image-captured position is shifted in a state in which the operation button is pressed down.

Moreover, in a case in which the word or phrase for which its meaning and Japanese reading is desirably displayed is split caused by a start of a new line, extraction of the word or phrase is carried out by carrying out the following processes.

For example, assume that " . . . THIS YEAR'S HOKKAI" and "DO IN THE SUMMER IS VE . . . " are split apart although these are of one sentence, and that the character string obtaining section 21 obtains "THIS YEAR'S HOKKAI" from a character string in a previous line before a new line is started and thereafter obtains "DO IN THE SUMMER IS VE" from the character string in the new line. That is to say, the posture of obtaining the already saved character string (character string before the new line is started: "THIS YEAR'S HOKKAI") is changed and the image-captured position is moved to the beginning of a subsequent line so that the predetermined position comes to the position of "DO". As a result of the user changing the image-captured position and capturing the video while pressing down the operation button as such, the character string obtaining section 21 obtains, as the currently obtained character string, the character string of "DO IN THE SUMMER IS VE" as illustrated in FIG. 19. FIG. 19 illustrates another embodiment (Embodiment 2) of the present invention, and is a view illustrating one example of a display state in which, to a word or phrase extracted from the character string, which word or phrase is in the vicinity of the predetermined position, a Japanese reading and meaning of the word or phrase is displayed.

Figure 22:
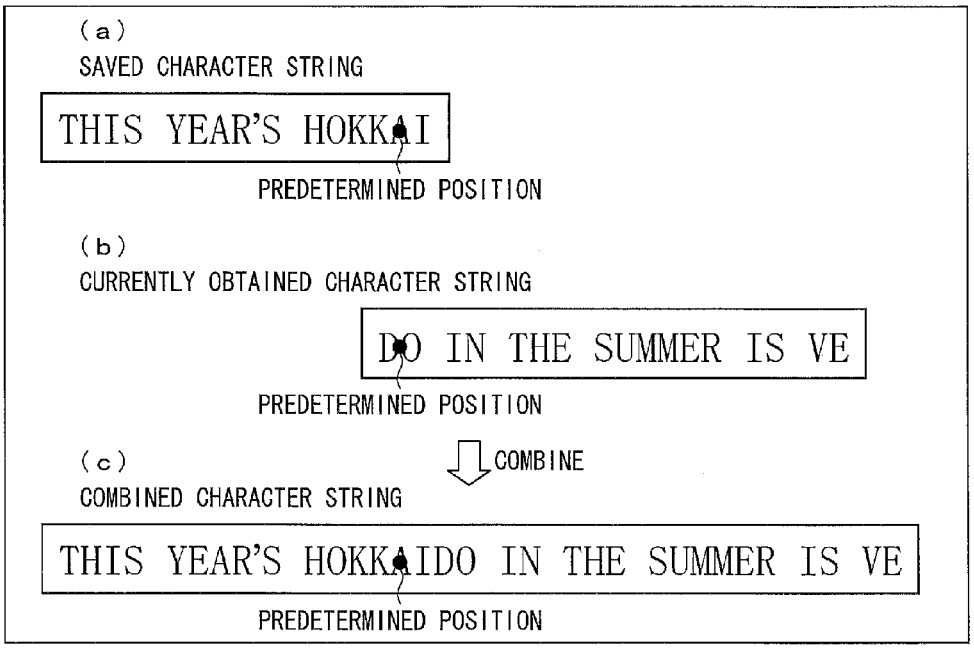
FIG. 22 illustrates another embodiment of the present invention, and is a view illustrating a relationship between (a) a stored character string, (b) a currently obtained character string, and (c) a combined character string combining these two character strings together.

As such, the already saved character string is "THIS YEAR'S HOKKAI" whereas the currently obtained character string is "DO IN THE SUMMER IS VE", as illustrated in FIG. 22. FIG. 22 illustrates another embodiment (Embodiment 2) of the present invention, and is a view illustrating a relationship of the saved character string, the currently obtained character string, and a combined character string in which these character strings are combined.

When the saved character string is overwritten on the obtained character string based on the predetermined position in this case, the character string will be "THIS YEAR'S HOKKAI IN THE SUMMER IS VE". However, with the portable phone 1 according to Embodiment 2, when one of the saved character string and the currently obtained character string is a character string positioned at a beginning of a line and the other one is a character string positioned at an end of a line, a combined character string as illustrated in FIG. 22 is generated. Namely, the character strings are not overwritten as they are; the saved character string is joint with the currently obtained character string, to generate a combined character string that is a character string of "THIS YEAR'S HOKKAIDO IN THE SUMMER IS VE". In this case, if the dictionary table 70 includes a character string of "HOKKAIDO", the extraction result of the word or phrase in the combined character string by the character string collation section 22 is "HOKKAIDO".

Hence, even in a case in which the image-captured position of the image capturing section 8 is moved to a character string in a start of a line while pressing down the operation button in a state in which a character string in the vicinity of an end of a line is extracted, that is, even in a case in which the word or phrase is split apart by a start of a new line, it is possible to appropriately extract that word or phrase.

Whether the saved character string and the currently obtained character string are a character string positioned on a start of a line or a character string positioned on an end of a line, can be determined by a character string obtained as described below. Namely, as illustrated in FIG. 22, in a case in which the obtained character string has a blank (space) of a certain range on a right side of the predetermined position, the character string obtaining section 21 determines that this obtained character string is a character string of a part at an end of the line. On the other hand, in a case in which the obtained character string has a blank (space) of a certain range on a left side of the predetermined position, the character string obtaining section 21 determines that the obtained character string is a character string of a part at the beginning of the line.

Figure 23:
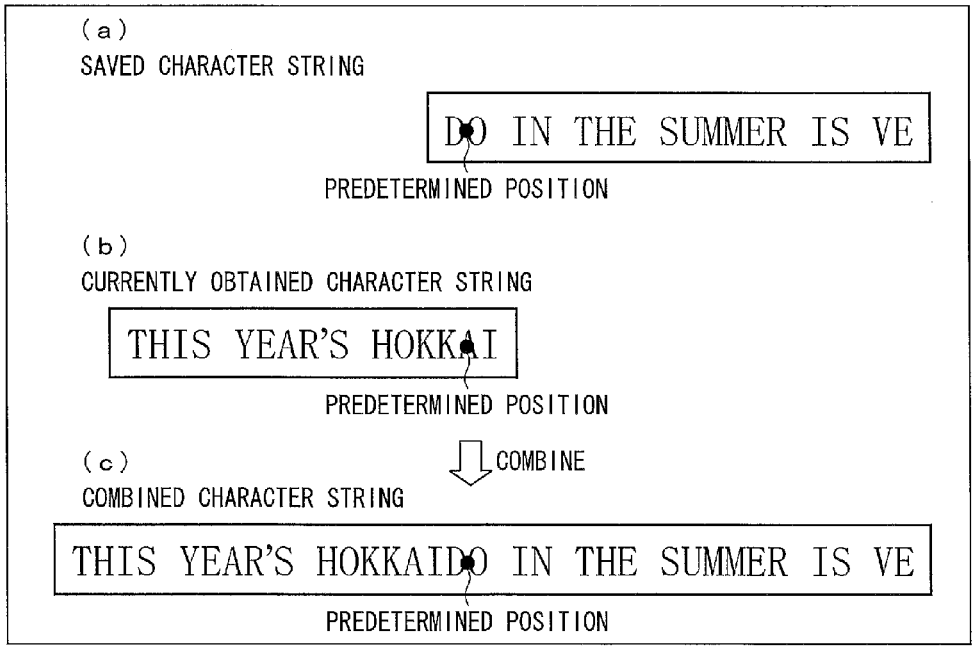
FIG. 23 illustrates another embodiment of the present invention, and is a view illustrating (a) a relationship between a stored character string, (b) a currently obtained character string, and (c) a combined character string combining these two character strings together.

Moreover, FIG. 22 illustrates a case in which the already obtained character string is a character string in an end part of a line, and the currently obtained character string is a character string at a beginning part of a line. Namely, FIG. 22 describes a case in which the image-captured position of the image capturing section 8 is moved from the end of a line to the beginning of a line. However, even with the case in which, as illustrated in FIG. 23, the already obtained character string is a character string at the beginning part of a line and the currently obtained character string is a character string at an end part of the line, it is possible to generate the character string of "THIS YEAR'S HOKKAIDO IN THE SUMMER IS VE" as the combined character string. Note that FIG. 23 illustrates another embodiment of the present invention, and is a view illustrating a saved character string, a currently obtained character string, and a combined character string in which these character strings are combined.

Embodiment 3

Figure 24:
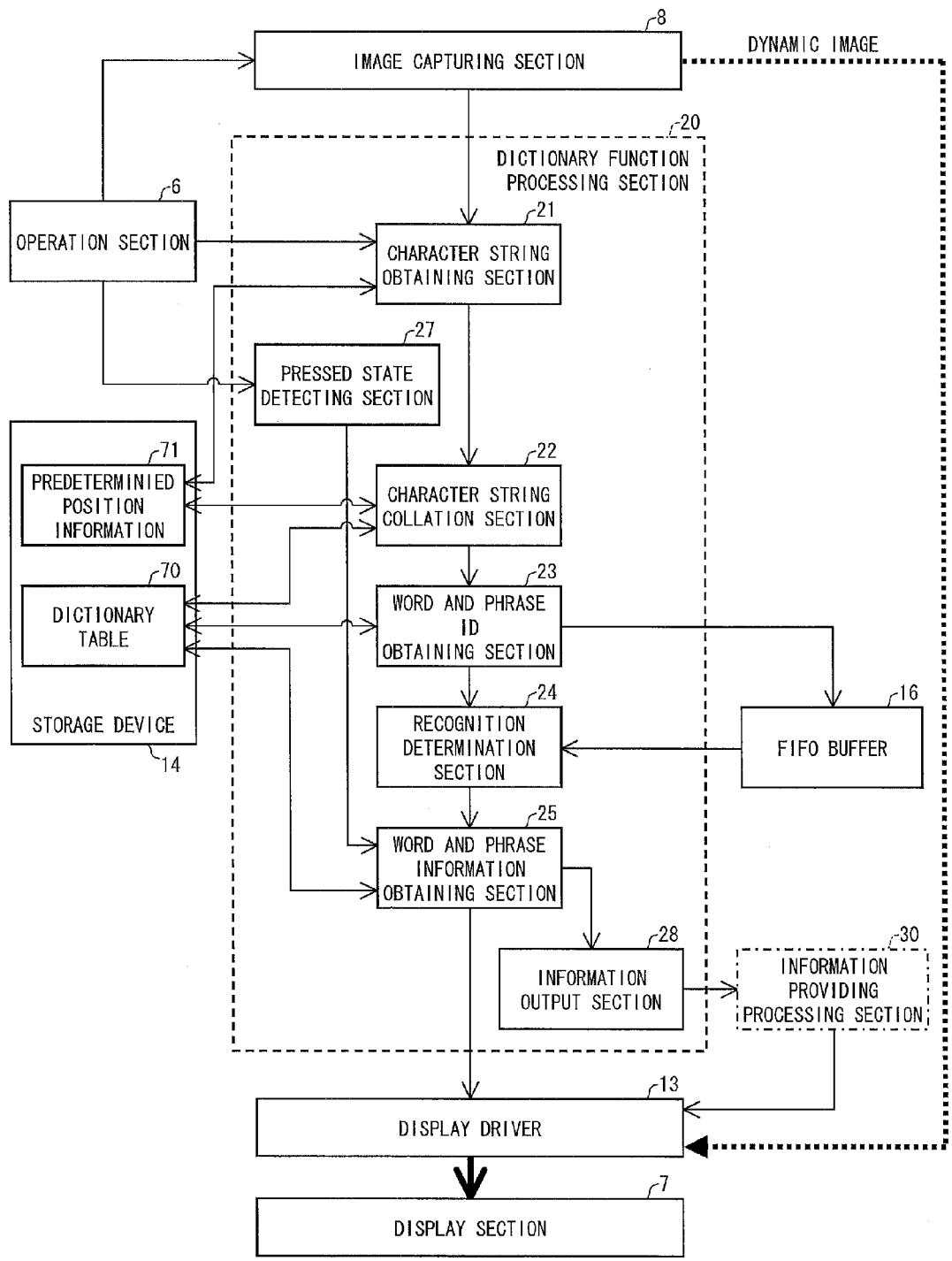
FIG. 24 illustrates another embodiment of the present invention, and is a block diagram illustrating a software configuration of a portable phone, which software configuration is related to a dictionary function.
Figure 25:
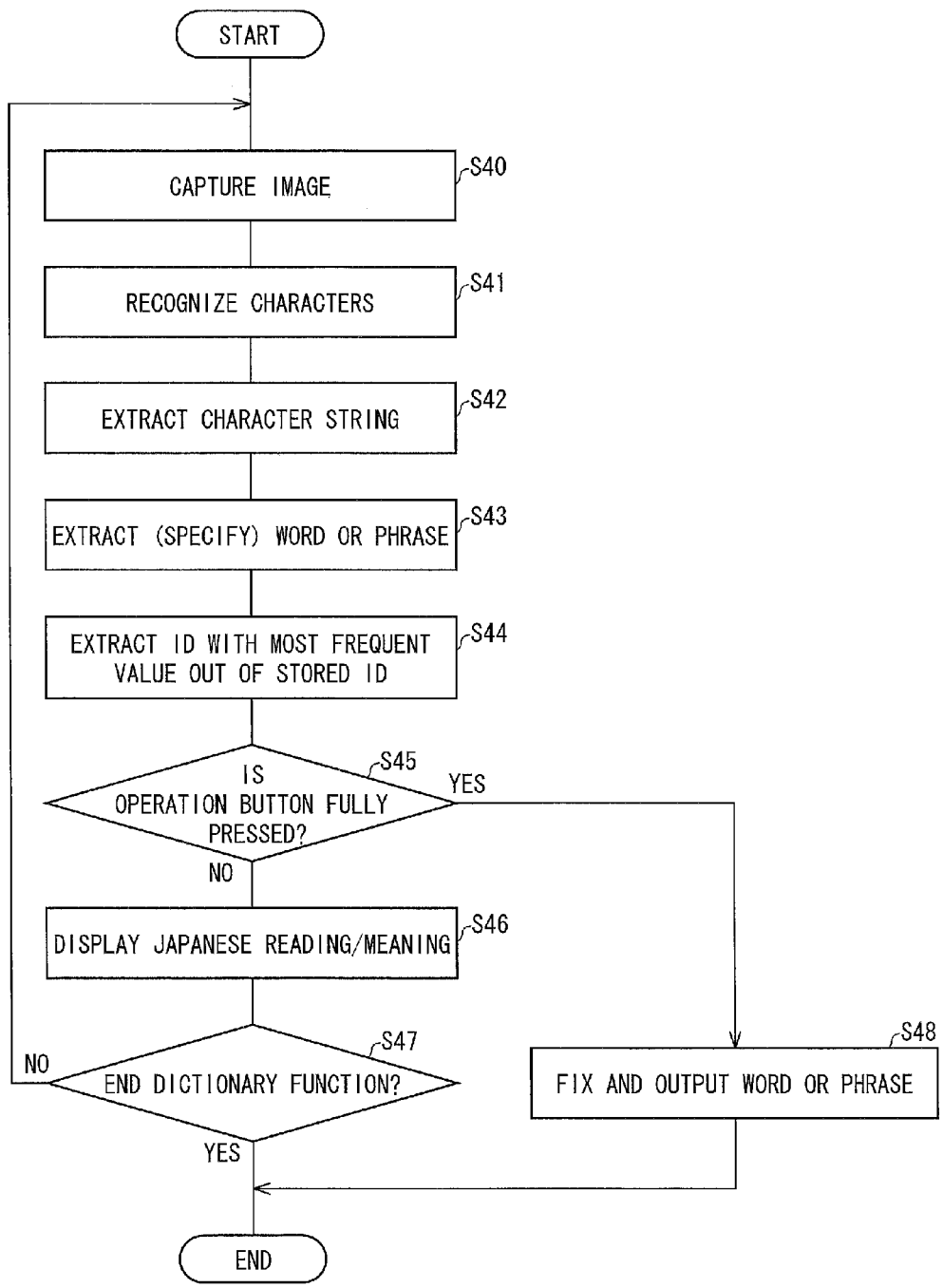
FIG. 25 illustrates another embodiment of the present invention, and is a flowchart illustrating processes carried out, which are related to a dictionary function of a portable phone.

Next described is the portable phone 1 according to Embodiment 3, with reference to FIG. 24 through FIG. 26. FIG. 24 illustrates another embodiment (Embodiment 3) of the present invention, and is a block diagram illustrating a software configuration of the portable phone 1 related to the dictionary function.

The portable phone 1 according to Embodiment 3 differs in a point that the operation section 6 is capable of receiving an entry (first entry, second entry) from a user in different entry stages (first entry stage, second entry stage), as compared to the portable phone 1 according to Embodiment 1. Moreover, these different entry stages are distinguishable by different pressed states (half-pressed, fully-pressed) of the operation button in the operation section 6. Furthermore, the portable phone 1 according to Embodiment 3 differs in a point that it further includes a pressed state detecting section (entry detecting means) 27 that can detect a switchover of pressed states of an operation button in the operation section 6, and an information output section (second output means) 28. Moreover, the portable phone 1 according to Embodiment 3 differs in a point that the main control section 15 further includes an information providing processing section (specific processing section) 30.

Moreover, the portable phone 1 according to Embodiment 3 is also different from that of Embodiment 1 in a point in which when the word and phrase information obtaining section 25 determines from the detection result received from the pressed state detecting section 27 that the operation button is fully pressed, a word or phrase corresponding to the ID notified from the recognition determination section 24 is sent to the information output section 28.

Except for the above points, the portable phone 1 according to Embodiment 3 is similar to the portable phone 1 according to Embodiment 1. Accordingly, members other than the pressed state detecting section 27, the information output section 28, and the information providing processing section 30 that are newly provided in the portable phone 1 of Embodiment 3, are each provided with reference signs identical to those of Embodiment 1, and descriptions thereof have been omitted.

The pressed state detecting section 27 detects a pressed state of the operation button in the operation section 6, by the user. The operation button provided in the portable phone 1 is to have two stages: a state in which the operation button is not fully pressed down but is pressed down by half (half-pressed); and a state in which the operation button is fully pressed down (fully-pressed). The pressed state detecting section 27 is capable of detecting which of the half-pressed and fully-pressed the pressed state of the operation button is. The pressed state detecting section 27 outputs a detected result to the word and phrase information obtaining section 25.

The information output section 28, upon receiving the word or phrase from the word and phrase information obtaining section 25, outputs the word or phrase to the information providing processing section 30.

The information providing processing section 30 is an application which provides information related to words and phrases, such as a Japanese dictionary, a Japanese-English dictionary, an English-Japanese dictionary, a Japanese-German dictionary, a German-Japanese dictionary, etc. The information providing processing section 30, upon receiving a word or a phrase from the information output section 28, retrieves information related to that word or phrase, and outputs a retrieval result to for example the display driver 13 to cause display of this result on the display section 7. The information related to the word or phrase may be, for example an English expression (English word) corresponding to the inputted word or phrase, or a meaning or the like of that English word.

In Embodiment 3, the portable phone 1 has the information providing processing section 30 provided inside the portable phone 1. However, the information providing processing section 30 may be provided in an external device separate from the portable phone 1. In this case, the information output section 28 outputs an ID to a wireless communication processing section 11 and instructs to transmit that ID to the information providing processing section 30 of that word or phrase, and further instructs to establish communication with the external device. In response to the instructions, the wireless communication processing section 11 establishes a communication with the external device via a base station, and transmits the word or phrase to the information providing processing section 30.

Moreover in Embodiment 3, the portable phone 1 includes one (1) information providing processing section 30. However, the configuration may be one in which an information providing processing section 30 is provided per each specific process to be executed.

Moreover, in the case in which the portable phone 1 includes the information providing processing section 30 therein, a program for executing various processes of the information providing processing section 30 and dictionary data may be downloaded from an external device or the like with which the communication is established via the base station.

Next described is the "processes carried out related to dictionary function" in the portable phone 1 according to Embodiment 3, with reference to FIG. 25. FIG. 25 illustrates another embodiment (Embodiment 3) of the present invention, and is a flowchart illustrating processes carried out that are related to the dictionary function of the portable phone 1. The processes from steps S40 to S44 in FIG. 25 are similar to the processes from steps S10 to S14 in FIG. 14, respectively, so therefore their descriptions have been omitted. Moreover, the process of step S47 in FIG. 25 is as with step S16 in FIG. 14, so therefore the description of this step has been omitted.

Similarly with the portable phone 1 according to Embodiment 1, the word and phrase information obtaining section 25 obtains, from the dictionary table 70, a word or a phrase corresponding to the received ID and a Japanese reading and meaning of that word or phrase, in response to the notification from the recognition determination section 24. At this time, the word and phrase information obtaining section determines whether or not the pressed state of the operation button is fully pressed (S45). With the portable phone 1 according to Embodiment 3, the pressed states of the operation button are set as either fully-pressed or half-pressed. Hence, if it is determined as not fully-pressed in step S45, this means that the pressed state of the operation button is half-pressed.

When the determination in step S45 is "NO", the word and phrase information obtaining section 25 transmits the word or phrase, the Japanese reading and meaning of that word or phrase, each obtained from the dictionary table 70, to the display driver 13. Thereafter, the display driver 13 causes the word or phrase and the meaning or Japanese reading of the word or phrase received from the word and phrase information obtaining section 25 to be displayed on the display section 7 (S46).

On the other hand, when the determination by step S45 is "YES", the word and phrase information obtaining section 25 transmits the word or phrase obtained from the dictionary table 70 to the information output section 28. The information output section 28 fixes the word or phrase received from the word and phrase information obtaining section 25 as the word or phrase to be outputted to the information providing processing section 30. Thereafter, that word or phrase is outputted to the information providing processing section 30. In a case in which the information providing processing section 30 is capable of different functions for example a Japanese dictionary and a Japanese-English dictionary, a display as illustrated in FIG. 26 may be displayed before the information output section 28 outputs the word or phrase to the information providing processing section 30, so as to ask the user for which function to execute and retrieve a processing result.

The operation button of the portable phone 1 according to Embodiment 3 is a button that can achieve two different pressed states, of "half-pressed" and "fully-pressed" as described above. However, the different pressed states are not limited to these states. For example, the configuration may achieve different pressed states by use of two physically different operation buttons. Alternatively, the different pressed states can be achieved by use of a sliding-type operation button that is capable of input in two stages.

Moreover, by having, in the configuration of the portable phone 1 according to Embodiment 2, the dictionary function processing section 20 further include the pressed state detecting section 27 and the information output section 28, and the main control section 15 include the information providing processing section 30, it is possible to combine the configuration of Embodiment 3 into that of Embodiment 2.

The portable phones 1 of Embodiments 1 through 3 are configurations in which the word or phrase to be extracted from an image is specified based on a center coordinate in the display screen of the display section 7. However, the standard is not limited to this. For example, the predetermined position on the display screen of the display section 7 may be provided with a symbol such as "x" or "+", and extraction of the character string may be performed based on a coordinate of the position of that symbol to specify the word or phrase from the character string.

Alternatively, in a case in which the portable phone 1 includes the so-called touch panel function, which touch panel function allows for a user to enter by touching the display screen of the display section 7, the configuration may be one in which a position (coordinate) touched by the user serves as the standard. For example, as illustrated in FIG. 15, when the user touches any position on the display screen, the character string obtaining section 21 extracts a character string including the touched coordinate. FIG. 15 illustrates an embodiment of the present invention, and is a view illustrating an example of a display state which displays, together with the word or phrase extracted from the character string which word or phrase is provided in the vicinity of the predetermined position, a Japanese reading and meaning of the word or phrase.

In this case, the portable phone 1 further includes, in the configuration illustrated in FIG. 1, a predetermined position information modification section (not illustrated) as detecting means according to the present invention. After the predetermined position information modification section obtains coordinate information indicative of a position on the display screen of the display section 7 at which is touched by the user, the predetermined position information modification section rewrites the predetermined position information 71 based on the obtained coordinate information. This allows for executing the dictionary function as having the position touched by the user serve as the predetermined position.

Moreover, the dictionary table 70 held in the portable phone 1 according to Embodiments 1 through 3 is stored as a table in which, as illustrated in FIG. 5, (a) an ID that identifies a word or phrase, (b) the word or phrase, and (c) a Japanese reading and meaning of that word or phrase, are associated to each other for each word or phrase. Moreover, a Japanese meaning and reading and an English meaning and reading of the word or phrase are stored in the same table, as illustrated in FIG. 5. However, the Japanese words and phrases and the English words and phrases may be managed in separate tables. Alternatively, a sub table for retrieval so that collation can be performed at high speed may be separately prepared. Moreover, the dictionary table 70 has the word or phrase and its meaning and reading be associated with each other; the table may be one in which the Japanese word or phrase and its English translation are associated with each other. Information to be associated with the word or phrase may be information of any detail that is desirably displayed together in relation with the word or phrase, and it is preferable that that information is determined depending on its use.

Moreover, the foregoing description had a depth of 8 for a queue configuration of the FIFO buffer 16 provided in the portable phone 1 of Embodiments 1 through 3. However, the depth is not limited to this. The depth of the queue configuration of the FIFO buffer 16 is related to a response speed such as switchover of display visible by the user for example the switchover of display of the meaning or reading, which switchover occurs in line with the change in the image captured subject. Namely, the depth relates to the speed in accordance with a determination of a recognition result of a new word or phrase by the recognition determination section 24, in line with the change in the image-captured position by the image capturing section 8.

Therefore, the depth of the queue configuration of the FIFO buffer 16 is suitably about one fifth fold to one fold of a frame rate (number of frames depicted in one second) of a video image-captured by the image capturing section 8. Namely, the FIFO buffer 16 can output a meaning or Japanese reading of a new ID by changing approximately half of the stored IDs into new IDs. Therefore, by setting the depth of the queue configuration of the FIFO buffer 16 to be around one fifth to one fold of the frame rate, it is possible to switch over the meaning or Japanese reading of the new word or phrase with a delay of just approximately 0.1 to 0.5 seconds by maximum.

Finally, the sections provided in the portable phone 1 of Embodiments 1 through 3, in particular, the sections provided in the dictionary function processing section 20, and the information providing processing section 30, may be realized by way of hardware or software as executed by a CPU as follows:

The portable phone 1 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the portable phone 1 a computer-readable storage medium containing control program code (executable program, intermediate code program, or source program) for the portable phone 1, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The portable phone 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (registered trademark), 802.11 wireless, HDR, mobile telephone network, satellite line, or terrestrial digital network. The present invention encompasses a carrier wave or data signal transmission in which the program code is embodied electronically.

The present invention is not limited to the description of the embodiments above, but may be altered by a skilled person within the scope of the claims. An embodiment based on a proper combination of technical means disclosed in different embodiments is encompassed in the technical scope of the present invention.

As described above, the information processing device according to the present invention may be said as including the following configurations.

As described above, the information processing device according to the present invention may be configured in such a manner that the storage section can store the word and phrase information to a predetermined number of pieces, and input to and output from the storage section of the word and phrase information is set so that the word and phrase information stored in the storage section is taken out in an order of earlier stored, i.e., in the order that the word and phrase information was stored. A method of taking out the word and phrase information in the order of earlier stored is, for example FIFO (First-In First-Out).

According to the configuration, the storage section is capable of storing the word and phrase information to a predetermined number, and inputs to and outputs from the storage section of the word and phrase information by taking out the word and phrase information stored in the storage section in an order of earlier stored. Hence, the storage section always stores the most recent pieces of word and phrase information of the predetermined number.

Here, the storage section can store a predetermined number of pieces of the word and phrase information. Hence, even if a piece of word and phrase information that includes an error is extracted from an image by the extraction means, the determining means determines as the recognition result the word or phrase of the word and phrase information stored in the storage section by the most number. Hence, it is possible to obtain a recognition result of an accurate word or phrase.

Furthermore, the storage section stores the most recent word and phrase information extracted by the extraction means. Hence, even in a case in which the image-captured position of the image capturing section is changed and the word or phrase at the predetermined position of the image that constitutes the moving image changes to a different word or phrase, when half or more of the predetermined number of pieces of word and phrase information stored in the storage section is replaced with pieces of word and phrase information obtained from images of a new image-captured position, that new word and phrase information is determined as a recognition result of the new word or phrase. The word and phrase information is extracted by the extraction means from consecutive images that constitute a video, and thus allows for obtaining a plurality of pieces of word and phrase information quickly.

Hence, the information processing device according to the present invention can determine a recognition result of the new word or phrase without using a large amount of time.

Moreover, for example, in a case in which, as with Patent Literature 3, images are captured for a series of an odd number of three times or more and a recognition result having a highest occurrence frequency as a result of character recognition of the images is extracted, processes that follow in response to the result of the character recognition may not be taken if the cutting out of the characters at the time of character recognition is erroneous or a misrecognition of the characters occur frequently, thereby making it difficult to obtain an accurate character recognition result. Accordingly, it is preferable that the information processing device according to the present invention further include a list information storage device that stores list information, the list information being a list of pieces of word and phrase information each indicative of a word or a phrase extracted from an image, the extraction means extracting, with reference to the list information, the word and phrase information of a word or a phrase at the predetermined position from the image constituting the moving image captured by the image capturing section.

Namely, the information processing device according to the present invention further includes a list information storage device, and the extraction means extracts the word and phrase information of the word or image from the moving image captured by the image capturing section, with reference to the list information. This allows for preventing recognition error of characters.

Hence, the information processing device according to the present invention is capable of recognizing words and phrases from an image quickly and accurately.

Moreover, as described above, the information processing device according to the present invention may be configured in such a manner that the list information is a table showing a corresponding relationship of a word or a phrase with an identifier that identifies that word or phrase, the extraction means includes: character string extraction means for extracting, from the obtained image, a character string containing the predetermined position; word and phrase specifying means for collating the character string extracted by the character string extraction means with the list information stored in the list information storage device, to specify the word or phrase at the predetermined position; and identifier obtaining means for obtaining an identifier of the specified word or phrase as word and phrase information indicative of a word or phrase specified by the word and phrase specifying means, by referring to the list information, and the storage section stores, as the word and phrase information, the identifier obtained by the identifier obtaining means.

According to the configuration, the storage section is configured so as to store the identifier obtained by the identifier obtaining means as the word and phrase information. Namely, the storage section stores not the actual word or phrase specified by the word and phrase specifying m cans with reference to the list information, but an identifier of that word or phrase. Hence, there is no need to compare the word or phrase itself when extracting the word or phrase stored in the storage section by the most number; just comparing the identifier is enough. Hence, it is possible to efficiently extract the word or phrase.

Moreover, as described above, it is preferable that the information processing device according to the present invention is configured in such a manner that the word and phrase specifying means collates the character string extracted by the character string extraction means with the list information stored in the list information storage device by use of dynamic programming, to specify a word or a phrase at the predetermined position.

According to the configuration, the word and phrase specifying means collates the character string extracted by the character string extraction means with the list information stored in the list information storage device, by use of dynamic programming.

There are cases with character recognition in which characters are mistakenly recognized, in which characters are recognized by omitting some characters, and in which rubbish or the like is recognized as a character, thereby resulting in a recognition including an unnecessary character. When such an erroneous recognition occurs, it is impossible to compare simply between the extracted character string and the list information.

The information processing device according to the present invention is a configuration in which the extracted character string is collated with the list information stored in the list information storage device, by use of dynamic programming. Accordingly, even in a case in which the erroneous character recognition occurs, collation is carried out upon calculating a similarity (distance between compared character strings), to extract the word or phrase that is closest to the character recognition result in the list information.

Moreover, as described above, the information processing device according to the present invention may be configured in such a manner that the list information has the word or phrase be associated with at least one of a meaning and reading of that word or phrase, the information processing device further including: meaning and reading obtaining means for obtaining, from the list information, at least one of the meaning and reading associated with the word or phrase that is determined as the recognition result by the determining means; and first output means for outputting at least one of the meaning and reading of the word or phrase that is obtained by the meaning and reading obtaining means.

According to the foregoing configuration, the meaning and reading obtaining means is capable of obtaining, from the list information, at least one of a meaning and reading associated with the word or phrase. Hence, it is possible to obtain at least one of the meaning and reading of the word or phrase that is determined as the recognition result. Furthermore, the information processing device further includes first output means, thereby making it possible to provide the obtained at least one of the meaning and reading.

Moreover, as described above, the information processing device according to the present invention may be configured so as to further include a display section that displays the moving image captured by the image capturing section, wherein the first output means outputs to the display section the at least one of the meaning and reading of the word or phrase obtained by the meaning and reading obtaining means, so that the display section is made to display the at least one of the meaning and reading of the word or phrase in a superposed manner on the moving image.

According to the configuration, the information processing device includes a display section. This allows for displaying at least one of the reading and meaning of the recognized word or phrase. Moreover, since the at least one of the reading and meaning is displayed in a superposed manner on the obtained moving image, it is possible to visually recognize the reading and/or meaning of the word or phrase at the predetermined position of the moving image.

Moreover, as described above, the information processing device according to the present invention further includes an operation receiving section that receives entry from a user; and entry detecting means for detecting whether or not an entry is received from the user by the operation receiving section, while the entry detecting means detects the entry from the user, the first output means continuously outputting to the display section the at least one of the meaning and reading of the word or phrase obtained by the meaning and reading obtaining means.

According to the configuration, while the entry detecting means detects an entry from the user, the first output means is capable of continuously outputting at least one of the meaning and reading of the word or phrase to the display section. Namely, it is possible to display, in a fixed manner, the at least one of the meaning and reading of the word or phrase, on the display section.

The information processing device according to the present invention is of a configuration in which characters are recognized in real time from an image that constitutes the moving image captured by the image capturing section. Hence, when the image-captured position of the image capturing section moves, the character to be recognized also switches to a different character, together with this move.

Accordingly, by having a configuration capable of displaying at least one of the meaning and reading of the word or phrase on the display section in a fixed manner as described above, it is possible to confirm at least one of the meaning and reading of the word or phrase that the user wishes to know, without being effected by the posture of the image capturing section.

Moreover, as described above, the information processing device according to the present invention may be configured so as to further include second output means for outputting the word and phrase information extracted by the extraction means to a specific processing section that executes a specific process with use of the word and phrase information, the operation receiving section being capable of receiving the entry from the user in various entry stages of a first entry stage and a second entry stage, while the entry detecting means is detecting a first entry serving as an entry of the first entry stage, the first output means continuously outputting to the display section the at least one of the meaning and reading of the word or phrase obtained by the meaning and reading obtaining means, and when the detection means detects that the first entry is switched to a second entry serving as an entry in the second entry stage, the second output means outputting the word and phrase information of the word or phrase to the specific processing section.

The different entry stages such as the first entry stage and the second entry stage, for example, in a case in which the operation receiving section is an operation button that can achieve different pressed states of half-pressed and fully-pressed, are entry stages distinguished by the differences between these pressed states.

According to the configuration, while the entry detecting means is detecting the first entry, the first output means continues to output at least one of the meaning and reading of the word or phrase obtained by the meaning and reading obtaining means, and when the detecting means detects a switch over from the first entry to the second entry, the second output means outputs the word and phrase information of the word or phrase to the specific processing section. Hence, by having the entry stage move from the first entry stage to the second entry stage, it is possible to have the information processing device carry out a different process in stages.

Moreover, as described above, the information processing device according to the present invention may be configured so as to further include a character string storage device that stores the character string extracted by the character string extraction means, wherein when the entry detecting means detects an entry from the user, the character string extraction means stores the character string extracted from the image into the character string storage device, and when the character string extraction means further extracts a new character string from the image, the newly extracted character string is overwritten on the character string stored in the character string storage device to create a combined character string, and the word and phrase identifying means collates the combined character string with the list information stored in the list information storage device.

According to the configuration, the information processing device includes the operation receiving section and the entry detecting means, thereby being capable of recognizing whether or not an operation from the user is received via the operation receiving section. When the entry from the user via the operation receiving section is detected, the character string extracted by the character string extraction means is stored into the character string storage device, thereby allowing for overwriting on a newly extracted character string with this stored character string.

The configuration here is one in which the newly extracted character string is overwritten with the character string stored into the character string storage device. Hence, this enables recognition of a word or phrase split into the end of a line and the beginning of a subsequent line due to the start of a new line or the like, in a joint manner.

Moreover, as described above, the information processing device according to the present invention may be configured in such a manner that the character string extraction means creates the combined character string by overwriting the character string stored in the character string storage device on the newly extracted character string, based on the predetermined position contained in the character string.

Moreover, as described above, the information processing device according to the present invention may be configured in such a manner that the extraction means extracts, as a word or a phrase at the predetermined position of the image, a piece of word and phrase information indicative of a word or a phrase displayed in the vicinity of a center coordinate position of a display area of the display section while that image is displayed on the display section.

Moreover, as described above, the information processing device according to the present invention may be configured further including detection means for detecting a physical contact on a display area of the display section, the extraction means detecting, as a word or a phrase at the predetermined position of the image, a piece of word and phrase information indicative of a word or a phrase displayed at a position detected by the detection means on the display area of the display section while that image is displayed on the display section.

Examples of the physical contact detected by the detection means are a physical contact such as, touching with a finger of a user or touching with a pen or like item.

According to the configuration, the extraction means is configured to extract word and phrase information indicative of a word or phrase displayed on a detected position by the detection means, namely the position on which the display area is contacted physically. Hence, it is possible for the user to freely select a word or phrase that the user wishes to extract its word and phrase information, by viewing and touching with a finger the image displayed on the display section.

Moreover, as described above, it is preferable that the information processing device according to the present invention is configured in such a manner that the storage section is capable of storing the word and phrase information by a predetermined number of one fifth to one fold of a frame rate of a video image captured by the image capturing section.

The predetermined number of pieces of word and phrase information that the storage section is capable of storing relates to a speed in accordance with the determination of a recognition result of a new word or a phrase in response to a change in the image-captured position by the image capturing section. Once the pieces of word and phrase information of not less than half the predetermined number are replaced with pieces of the word and phrase information obtained from an image of a new image-captured position in the storage section, the information processing device according to the present invention can determine those pieces of word and phrase information as the recognition result of the new word or phrase.

Accordingly, when the predetermined number of word and phrase information that the storage section can store is made one fifth to one fold of a frame rate of a video image captured by the image capturing section, it is possible to determine a recognition result of a new word or phrase with a delay of approximately 0.1 to 0.5 seconds at the maximum. This hence allows for preventing use of a large amount of time until the recognition result of the new word or phrase is determined, which large amount of time give a large burden on the user.

The information processing device may be accomplished by a computer. In this case, a control program that causes a computer to achieve the information processing device by having the computer operate as means of the information processing device, and a computer-readable recording medium storing thereon the control program are also within the scope of the present invention.

INDUSTRIAL APPLICABILITY

The portable phone 1 according to the present embodiment includes the character string obtaining section 21, the character string collation section 22, and the word and phrase ID obtaining section 23, which successively obtain consecutive images that constitute a moving image captured by the image capturing section 8 and obtain an ID indicative of a word or a phrase at a predetermined position of that image, the FIFO buffer 16 that stores the obtained ID, and the recognition determination section 24 that determines, as a recognition result, an ID stored in the FIFO buffer 16 by the most number. This allows for the portable phone 1 to recognize characters from an image quickly. Moreover, the character string collation section 22 is capable of matching a character string (input character string) obtained by the character string obtaining section 21, with reference characters stored in the dictionary table 70, by use of DP matching. Hence, it is possible to correctly recognize the word or phrase by covering the error of the character recognition.

Consequently, the portable phone 1 according to the present embodiment is broadly applicable to a device that requires quick and accurate recognition of characters from an image.

REFERENCE SIGNS LIST

1 portable phone (information processing device)
6 operation section (operation receiving section)
7 display section
8 image capturing section
13 display driver
14 storage device (list information storage device)
15 main control section
16 FIFO buffer (storage section)
17 memory (character string storage device)
20 dictionary function processing section
21 character string obtaining section (extraction means, character string extraction means)
22 character string collation section (extraction means, word and phrase specifying means)
23 word and phrase ID obtaining section (extraction means, identifier obtaining means)
24 recognition determination section (determining means)
25 word and phrase obtaining section (meaning and reading obtaining means, first output means)

26 button pressing detection section (entry detecting means)
27 pressed state detecting section (entry detecting means)
28 information output section (second output means)
30 information providing processing section (specific processing section)
70 dictionary table (list information)
71 predetermined position information

The invention claimed is:

1. An information processing device that carries out word or phrase recognition from an image, the information processing device comprising:
an image capturing section that captures a moving image;
extraction means for (i) successively obtaining consecutive images that constitute the moving image captured by the image capturing section and (ii) extracting word and phrase information being information indicative of a word or a phrase at a predetermined position of the image;
a storage section that stores the word and phrase information extracted by the extraction means;
determining means for determining, as a recognition result, a word or a phrase of a piece of the word and phrase information that is stored by the most number in the storage section, wherein
the storage section can store the word and phrase information to a predetermined number of pieces, and input to and output from the storage section of the word and phrase information is set so that the word and phrase information stored in the storage section is taken out in an order of earlier stored; and
a list information storage device that stores list information, the list information being a list of pieces of word and phrase information each indicative of a word or a phrase extracted from an image, wherein
the extraction means extracting, with reference to the list information, the word and phrase information of a word or a phrase at the predetermined position from the image constituting the moving image captured by the image capturing section.

2. The information processing device according to claim 1, wherein
the list information is a table showing a corresponding relationship of a word or a phrase with an identifier that identifies that word or phrase,
the extraction means comprises:
character string extraction means for extracting, from the obtained image, a character string containing the predetermined position;
word and phrase specifying means for collating the character string extracted by the character string extraction means with the list information stored in the list information storage device, to specify the word or phrase at the predetermined position; and
identifier obtaining means for obtaining an identifier of the specified word or phrase as word and phrase information indicative of a word or phrase specified by the word and phrase specifying means, by referring to the list information, and
the storage section stores, as the word and phrase information, the identifier obtained by the identifier obtaining means.

3. The information processing device according to claim 2, wherein
the word and phrase specifying means collates the character string extracted by the character string extraction means with the list information stored in the list information storage device by use of dynamic programming, to specify a word or a phrase at the predetermined position.

4. The information processing device according to claim 2, wherein
the list information has the word or phrase be associated with at least one of a meaning and reading of that word or phrase,
the information processing device further comprising:
meaning and reading obtaining means for obtaining, from the list information, at least one of the meaning and reading associated with the word or phrase that is determined as the recognition result by the determining means; and
first output means for outputting at least one of the meaning and reading of the word or phrase that is obtained by the meaning and reading obtaining means.

5. The information processing device according to claim 4, further comprising:
a display section that displays the moving image captured by the image capturing section,
wherein the first output means outputs to the display section the at least one of the meaning and reading of the word or phrase obtained by the meaning and reading obtaining means, so that the display section is made to display the at least one of the meaning and reading of the word or phrase in a superposed manner on the moving image.

6. The information processing device according to claim 5, further comprising:
an operation receiving section that receives entry from a user; and
entry detecting means for detecting whether or not an entry is received from the user by the operation receiving section,
while the entry detecting means detects the entry from the user, the first output means continuously outputting to the display section the at least one of the meaning and reading of the word or phrase obtained by the meaning and reading obtaining means.

7. The information processing device according to claim 6, further comprising:
second output means for outputting the word and phrase information extracted by the extraction means to a specific processing section that executes a specific process with use of the word and phrase information,
the operation receiving section being capable of receiving the entry from the user in various entry stages of a first entry stage and a second entry stage,
while the entry detecting means is detecting a first entry serving as an entry of the first entry stage, the first output means continuously outputting to the display section the at least one of the meaning and reading of the word or phrase obtained by the meaning and reading obtaining means, and
when the detection means detects that the first entry is switched to a second entry serving as an entry in the second entry stage, the second output means outputting the word and phrase information of the word or phrase to the specific processing section.

8. The information processing device according to claim 6, further comprising:
a character string storage device that stores the character string extracted by the character string extraction means, wherein
when the entry detecting means detects an entry from the user, the character string extraction means stores the character string extracted from the image into the character string storage device, and when the character string extraction means further extracts a new character string from the image, the newly extracted character string is overwritten on the character string stored in the character string storage device to create a combined character string, and the word and phrase identifying means collates the combined character string with the list information stored in the list information storage device.

9. The information processing device according to claim 5, wherein the extraction means extracts, as a word or a phrase at the predetermined position of the image, a piece of word and phrase information indicative of a word or a phrase displayed in the vicinity of a center coordinate position of a display area of the display section while that image is displayed on the display section.

10. The information processing device according to claim 5, further comprising detection means for detecting a physical contact on a display area of the display section, the extraction means detecting, as a word or a phrase at the predetermined position of the image, a piece of word and phrase information indicative of a word or a phrase displayed at a position detected by the detection means on the display area of the display section while that image is displayed on the display section.

11. The information processing device according to claim 8, wherein the character string extraction means creates the combined character string by overwriting the character string stored in the character string storage device on the newly extracted character string, based on the predetermined position contained in the character string.

12. A information processing device that carries out word or phrase recognition from an image, the information processing device comprising:

an image capturing section that captures a moving image;

extraction means for (i) successively obtaining consecutive images that constitute the moving image captured by the image capturing section and (ii) extracting word and phrase information being information indicative of a word or a phrase at a predetermined position of the image;

a storage section that stores the word and phrase information extracted by the extraction means; and determining means for determining, as a recognition result, a word or a phrase of a piece of the word and phrase information that is stored by the most number in the storage section, wherein the storage section can store the word and phrase information to a predetermined number of pieces, and input to and output from the storage section of the word and phrase information is set so that the word and phrase information stored in the storage section is taken out in an order of earlier stored, and the storage section is capable of storing the word and phrase information by a predetermined number of one fifth to one fold of a frame rate of a video image captured by the image capturing section.

13. A method of controlling an information processing device that includes an image capturing section and a storage section and that carries out recognition of words and phrases from an image, the method comprising the steps of:
(a) capturing a moving image with use of the image capturing section;
(b) successively obtaining consecutive images that constitute the moving image captured in the step (a) and extracting word and phrase information being information indicative of a word or phrase at a predetermined position of the image;
(c) storing the word and phrase information extracted in the step (b) into the storage section;
(d) determining, as a recognition result, a word or a phrase of the piece of the word and phrase information that is stored by the most number in the storage section;
(e) storing the word and phrase information to a predetermined number of pieces;
(f) inputting and outputting of the stored word and phrase information is set so that the stored word and phrase information is taken out in an order of earlier stored;
(g) storing list information, the list information being a list of pieces of word and phrase information each indicative of a word or a phrase extracted from an image; and
(h) extracting, with reference to the list information, the word and phrase information of a word or a phrase at the predetermined position from the image constituting the captured moving image captured in the step (a).

14. A non-transitory computer-readable recording medium having stored thereon a program for controlling the information processing device that makes a computer operate as means of the information processing device as set forth in claim 1.

15. A method of controlling an information processing device that includes an image capturing section and a storage section and that carries out recognition of words and phrases from an image, the method comprising the steps of:
(a) capturing a moving image with use of the image capturing section;
(b) successively obtaining consecutive images that constitute the moving image captured in the step (a) and extracting word and phrase information being information indicative of a word or phrase at a predetermined position of the image;
(c) storing the word and phrase information extracted in the step (b) into the storage section;
(d) determining, as a recognition result, a word or a phrase of the piece of the word and phrase information that is stored by the most number in the storage section;
(e) storing the word and phrase information to a predetermined number of pieces;
(f) inputting and outputting of the stored word and phrase information is set so that the stored word and phrase information is taken out in an order of earlier stored; and
(i) storing the word and phrase information by a predetermined number of one fifth to one fold of a frame rate of a video image captured in the step (a).

* * * * *